United States Patent
Kim et al.

(10) Patent No.: US 9,100,866 B2
(45) Date of Patent: *Aug. 4, 2015

(54) METHOD AND APPARATUS FOR TRANSMITTING REFERENCE SIGNAL FOR REDUCING INTERCELL INTERFERENCE IN MULTIPLE INPUT MULTIPLE OUTPUT COMMUNICATION SYSTEM

(71) Applicant: LG ELECTRONICS INC., Seoul (KR)

(72) Inventors: Eun Sun Kim, Gyeonggi-Do (KR); Ki Jun Kim, Gyeonggi-Do (KR); Hak Seong Kim, Gyeonggi-Do (KR); Han Byul Seo, Gyeonggi-Do (KR); Byoung Hoon Kim, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/226,513

(22) Filed: Mar. 26, 2014

(65) Prior Publication Data

US 2014/0286184 A1 Sep. 25, 2014

Related U.S. Application Data

(63) Continuation of application No. 13/384,755, filed as application No. PCT/KR2010/004934 on Jul. 27, 2010, now Pat. No. 8,730,897.

(60) Provisional application No. 61/229,241, filed on Jul. (Continued)

(30) Foreign Application Priority Data

Feb. 12, 2010 (KR) ........................ 10-2010-0013596
May 10, 2010 (KR) ........................ 10-2010-0043600

(51) Int. Cl.
*H04W 4/00* (2009.01)
*H04W 24/08* (2009.01)
(Continued)

(52) U.S. Cl.
CPC ............... *H04W 24/08* (2013.01); *H04B 7/024* (2013.01); *H04B 7/0413* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 2010/0272032 A1 | 10/2010 | Sayana et al. | |
| 2011/0286423 A1 | 11/2011 | Berggren et al. | |
| 2012/0113851 A1 | 5/2012 | Schober et al. | |

FOREIGN PATENT DOCUMENTS

KR 10-2009-0043173 5/2009

OTHER PUBLICATIONS

K.B. Letaief et al., "Dynamic multiuser resource allocation and adaptation for wireless systems," IEEE Wireless Communications, pp. 38-47, Aug. 2006.

(Continued)

*Primary Examiner* — Chi H Pham
*Assistant Examiner* — Raul Rivas
(74) *Attorney, Agent, or Firm* — Lee, Hong, Degerman, Kang & Waimey

(57) ABSTRACT

According to one embodiment, a method for receiving a Channel State Information-Reference Signal (CSI-RS) for measuring a channel includes: receiving CSI-RSs on resource elements (REs) in a subframe configured for the CSI-RSs from a base station, wherein if each CSI-RS of the received CSI-RSs is transmitted from each of four or more transmit antenna ports of the base station, at least two REs on which each CSI-RS is received are associated with each of the four or more transmit antenna ports; and transmitting channel state information based on the received CSI-RSs.

16 Claims, 9 Drawing Sheets

Related U.S. Application Data 28, 2009, provisional application No. 61/229,244, filed on Jul. 28, 2009, provisional application No. 61/234,990, filed on Aug. 18, 2009, provisional application No. 61/260,405, filed on Nov. 12, 2009.

(51) Int. Cl.
*H04B 7/02* (2006.01)
*H04B 7/04* (2006.01)
*H04L 5/00* (2006.01)

(56) References Cited

OTHER PUBLICATIONS

S. Parkvall et al., "LTE-Advanced—Evolving LTE towards IMT-Advanced," IEEE Vehicular Technology Conference, pp. 1-5, Sep. 2008.

D. Astely et al., "LTE: The Evolution of Mobile Broadband," IEEE Communications Magazine, pp. 44-51, Apr. 2009.

METHOD AND APPARATUS FOR TRANSMITTING REFERENCE SIGNAL FOR REDUCING INTERCELL INTERFERENCE IN MULTIPLE INPUT MULTIPLE OUTPUT COMMUNICATION SYSTEM

CROSS-REFERENCE TO RELATED APPLICATIONS

This application is a continuation of U.S. application Ser. No. 13/384,755, filed on Jan. 18, 2012, now U.S. Pat. No. 8,730,897, which is the National Stage filing under 35 U.S.C. 371 of International Application No. PCT/KR2010/004934, filed on Jul. 27, 2010, which claims the benefit of earlier filing date and right of priority to Korean Application Nos. 10-2010-0043600, filed on May 10, 2010, and 10-2010-0013596, filed on Feb. 12, 2010, and also claims the benefit of U.S. Provisional Application Nos. 61/260,405, filed on Nov. 12, 2009, 61/234,990, filed on Aug. 18, 2009, 61/229,244, filed on Jul. 28, 2009, and 61/229,241, filed on Jul. 28, 2009, the contents of which are all hereby incorporated by reference herein in their entireties.

TECHNICAL FIELD

The present invention relates to allocation and transmission of a reference signal for channel measurement in a multiple antenna communication system, and more particularly, to a method and apparatus for transmitting a reference signal for reducing inter-cell interference.

BACKGROUND ART

Generally, data transmitted through a radio channel in a wireless communication system may have signal distortion. In order to normally decode the distorted signal by a receiving side, information on a transmission channel has to be provided, and the distortion of the received signal has to be compensated based on the information on the transmission channel. In order for the receiving side to check the information on a transmission channel, a transmitting side has to transmit a signal recognized by both the transmitting side and the receiving side. The receiving side can check the information on the transmission channel with reference to a distorted degree of the signal received through the transmission channel. Here, the signal recognized by both the transmitting side and the receiving side is called a 'pilot signal' or a 'reference signal (RS)'.

Recently, a wireless communication system enhances the efficiency of data transmission and reception by adopting a multiple input multiple output (MIMO) scheme for transmitting data with using multiple transmit antennas and multiple reception antennas. In the communication system based on the MIMO scheme, each transmit antenna is provided with an independent channel. Accordingly, a channel state between each transmit antenna and each reception antenna can be checked by transmitting a reference signal independent from each transmit antenna.

Generally, a reference signal may be classified into a reference signal for acquiring channel information, and a reference signal for demodulating data.

The reference signal for acquiring channel information is used for a user equipment (UE, or terminal) to acquire downlink channel information. Since even a UE which does not receive downlink data in a specific subframe has to receive and measure the reference signal, the reference signal for acquiring channel information is transmitted to a broadband. The reference signal for acquiring channel information is also used to measure a handover, etc.

On the other hand, the reference signal for demodulating data is transmitted by being included in a corresponding resource when a base station transmits data to a UE through a downlink. A UE receives the reference signal for demodulating data, thereby performing channel estimation and demodulating received data. Accordingly, the reference signal for demodulating data is transmitted by being included in a data transmission region.

In a case that signal overlapping occurs between neighboring cells at the time of transmitting a reference signal, inter-cell interference may occur to lower a channel estimation performance. Especially, if the number of transmit antennas is increased, interference due to overlapping of a reference signal transmission pattern may occur more frequently.

In order to reduce inter-cell interference and to enhance a communication performance of a UE positioned at the edge of a cell in a multi-cell environment, a coordinated multi-point transmission/reception (CoMP) method has been proposed. The CoMP method indicates a communication method for two or more base stations or cells with a corresponding UE in a coordinated (cooperative) manner so as to more smoothly perform a communication between a specific UE and a base station (eNB, access point) or a cell.

The CoMP method may be classified into two types according to a data transmission configuration from each base station or each cell. According to a joint processing (CoMP-JP) method, data is simultaneously transmitted to a UE from each base station which performs a CoMP operation, and the UE couples the signals received from the respective base stations to each other thus to enhance a reception performance. On the other hand, according to a cooperative scheduling/beamforming (CoMP-CS) method, data is instantaneously transmitted from one base station to one UE, and scheduling or beamforming is performed so as to minimize interference on the UE resulting from other base station.

According to the CoMP method, the UE commonly receives data information and control information from a multi-cell base station. This may enhance a communication performance of the UE positioned at the edge of a cell. In order to perform a CoMP operation, a CoMP cluster, a cluster of a base station such as BS, eNB, cell and Access Point capable of substantially performing a CoMP operation has to be firstly determined. A cluster configuration method may be classified into a method for configuring and managing a cluster by a system or an additional base station controller, and a method for configuring and managing a cluster by each UE according to a subject of a configuration.

FIG. 12 is a view schematically showing a method for configuring a CoMP cluster.

FIG. 12(a) shows a method for configuring a cluster by a system. Referring to FIG. 12(a), each UE measures interference amounts from adjacent base stations, and obtains an average of the measured interference amounts for a predetermined time period. Then, the UE transmits the average information to a system. Based on the received information, the system configures a cluster by collecting eNBs expected to have the most enhanced transmission performance owing to a large amount of mutual interference when using a CoMP operation. The number of base stations which belong to one cluster may be variable according to an environment, and each cluster may have a different number of base stations. For convenience, FIG. 12(a) shows a case that each Cluster has three base stations.

FIG. 12(b) shows a case that a UE configures a cluster. UE1 and UE2 measure interference amounts from adjacent base stations, and obtains an average of the measured interference amounts for a predetermined time period, respectively. Then, the UE1 and UE2 directly configure a cluster by collecting eNBs expected to have the most enhanced transmission performance owing to a large amount of mutual interference when using a CoMP operation. Then, the UE1 and UE2 exchange information on the configured cluster with the system. Like in FIG. 12(a), it is assumed that one cluster consists of three base stations in FIG. 12(b). The number of base stations which belong to one cluster may be variable, and each cluster may have a different number of base stations.

In the CoMP system, a reference signal has to be allocated and transmitted so as to perform channel measurement and data demodulation. However, an efficient method to allocate and transmit a reference signal has not been defined in the CoMP system. Furthermore, a method for reducing inter-cell interference due to overlapping of a reference signal transmission pattern has not been disclosed in the CoMP system.

DISCLOSURE OF INVENTION

Technical Problem

Therefore, it is an object of the present invention to provide a method capable of efficiently allocating and transmitting a reference signal even when a base station supports 4~8 transmit antennas like in an LTE-A system.

It is another object of the present invention to provide a method for transmitting a reference signal capable of reducing inter-cell interference.

It is still another object of the present invention to provide a method and apparatus for transmitting a reference signal for channel measurement capable of reducing a transmission overhead of a Channel State Information-Reference Signal (CSI-RS) in a single cell communication environment or a CoMP communication system, and capable of smoothly transmitting and measuring a CSI-RS.

Solution to Problem

To achieve these and other advantages and in accordance with the purpose of the present invention, as embodied and broadly described herein, there is provided a method for transmitting a reference signal, in a method for transmitting a Channel State Information-Reference Signal (CSI-RS) for measuring a transmission channel according to each antenna and a data signal in a broadband wireless communication system based on a MIMO scheme through a plurality of antennas, the method comprising: nulling or puncturing resource elements (REs) overlapping REs to which CSI-RSs of neighboring cells have been allocated, and then repeatedly allocating a CSI-RS of each antenna to the punctured RE with an interval of frequency REs; allocating data signals to redundant REs; transmitting, to a user equipment (UE), information on RE positions to which the CSI-RSs have been allocated; and transmitting a data packet including the CSI-RSs and the data signals.

To achieve these and other advantages and in accordance with the purpose of the present invention, as embodied and broadly described herein, there is also provided an apparatus for transmitting a reference signal, in an apparatus for transmitting a Channel State Information-Reference Signal (CSI-RS) for measuring a transmission channel according to each antenna and a data signal in a broadband wireless communication system based on a MIMO scheme through a plurality of antennas, the apparatus comprising: a plurality of transmit antennas; a transmitter for transmitting information on the CSI-RSs, the data signals, and allocation positions of the CSI-RSs; and a controller for allocating the CSI-RSs of the plurality of transmit antennas and the data signals to resource elements, wherein the controller nulls or punctures resource elements (REs) overlapping REs to which CSI-RSs of neighboring cells have been allocated, then repeatedly allocating a CSI-RS of each antenna to the punctured RE with an interval of frequency REs, and allocates data signals to redundant REs.

Advantageous Effects of Invention

The present invention may have the following advantages.

Firstly, even if a base station supports 4~8 transmit antennas like in an LTE-A system, an efficient method for allocating and transmitting a reference signal may be provided.

Secondly, even if the base station has a plurality of transmit antennas, a channel estimation performance and a data transmission rate may not be lowered.

Thirdly, inter-cell interference may be reduced.

Fourthly, radio resource information scheduled with respect to a CSI-RS may be effectively indicated by a reference signal period, a reference signal transmission offset, a reference signal transmission length, etc., thereby allowing a receiving side such as a UE to precisely receive and measure the reference signal.

Fifthly, a transmission overhead of a reference signal in a multi-antenna system may be reduced by reducing the number of times that the CSI-RIs are transmitted.

Sixthly, reference signal-related information of neighboring cells may be effectively transmitted to a receiving side such as a UE in a CoMP system. This may allow cells participating in a CoMP operation to easily cooperate with one another, resulting in enhanced transmission efficiency to the receiving side such as a UE.

MODE FOR THE INVENTION

Figure 1:
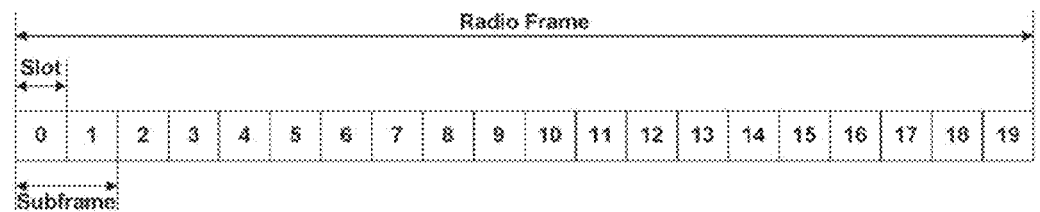
FIG. 1 is a view showing a structure of a downlink radio frame according to one embodiment of the present invention.

Reference will now be made in detail to the preferred embodiments of the present invention, examples of which are illustrated in the accompanying drawings.

Hereinafter, preferred embodiment of the present invention will be explained in more detail with reference to the attached drawings. The same or similar components will be provided with the same reference numerals, and the same explanations will be omitted. If detailed explanations related to the present invention are determined to make the technical features of the present invention unclear, they will be omitted. It should be noted that the attached drawings are merely provided for understanding of the present invention and thus the present invention is not limited thereto.

Firstly, terms used in a preferred embodiment of the present invention will be explained.

Communication System

A communication system of the present invention is a multiple access system which provides a communication with multiple users by sharing radio resources such as a frequency band and time. Multiple access schemes applied to the communication system of the present invention may include time division multiple access (TDMA), frequency division multiple access (FDMA), code division multiple access (CDMA), orthogonal frequency division multiple access (OFDMA), single carrier frequency division multiple access (SC-FDMA), or other well-known multiple access techniques. Multiple access for downlink transmission may be different from multiple access for uplink transmission. For instance, the OFDMA may be used for downlink transmission, and the SC-FDMA may be used for uplink transmission.

The communication system of the present invention is a system for providing various communication services such as voice and packet data, and includes a base station and a terminal (user interface, UE). For instance, the communication system may be a 3rd Generation Partnership Project (3GPP) Long Term Evolution (LTE) system, or a 3GPP LTE-A (LTE-Advanced) system, etc. The following communication system is not limited to a specific system. However, for convenience, the communication system will be explained as the 3GPP LTE/LTE-A system.

User Equipment (UE, or Terminal)

A terminal of the present invention may be called a subscriber station (SS), a user equipment (UE), a mobile equipment (ME), a mobile station (MS), etc., and includes a portable device having a communication function such as a portable phone, a PDA, a smart phone, and a notebook computer, or a non-portable device such as a PC and a vehicle mounted device.

Base Station

A base station of the present invention indicates a fixed point communicating with a UE, and may be called an evolved-NodeB (eNB), a NodeB (NB), a base station (BS), a base transceiver system (BTS), an access point, etc. One base station provides a communication service for one or more cells, and an interface for user traffic transmission or control traffic transmission may be used between the base stations.

Relay Node

A relay node (RN) of the present invention may be called a relay, a relay station (RS), etc., and relays a transmission/reception signal by being installed between a base station and a UE. The relay node covers a partial shadow area occurring from inside of a cell region, widens a cell service region, and enhances a system capacity. The relay node may be configured as a multiple hop so as to effectively relay data traffics generated between the base station and the UE. Alternatively, the relay mode may be fixed to one position, or may have mobility.

Downlink, Uplink

A downlink indicates a communication channel toward a UE from a base station, and an uplink indicates a communication channel toward a base station from a UE. At the downlink, a transmitting end may be a part of a base station, and a receiving end may be a part of a UE. At the uplink, a transmitting end may be a part of a UE, and a receiving end may be a part of a base station.

FIG. 1 is a view showing a structure of a downlink radio frame according to one embodiment of the present invention.

The downlink radio frame according to one embodiment of the present invention consists of ten subframes, and one subframe consists of two slots. The downlink radio frame may be configured by a frequency division duplex (FDD) or a time division duplex (TDD). Time during which one subframe is transmitted is called a transmission time interval (TTI). For instance, a length of one subframe may be 1 ms, and a length of one slot may be 0.5 ms. One slot includes a plurality of orthogonal frequency division multiplexing (OFDM) symbols in a time domain, and a plurality of resource blocks (RB) in a frequency domain.

Figure 2:
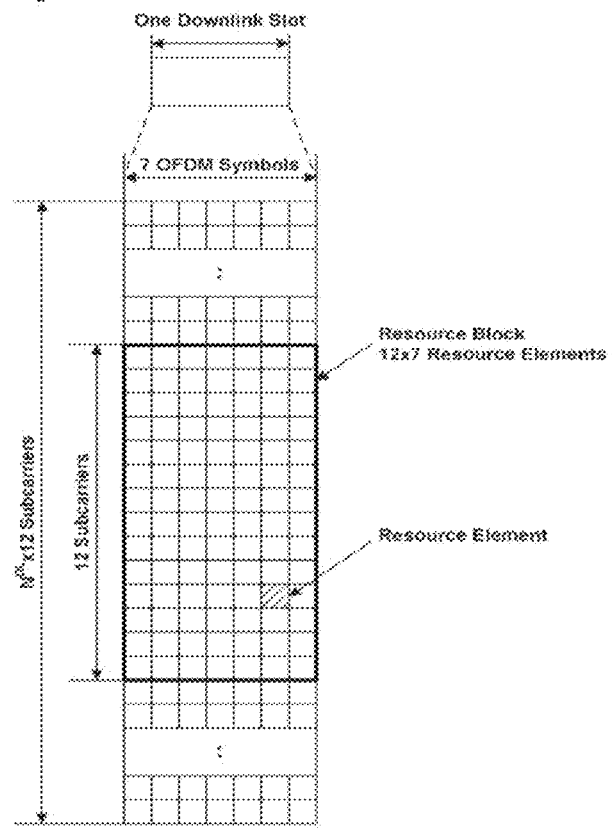
FIG. 2 is a view showing a resource grid with respect to one downlink slot according to one embodiment of the present invention.

FIG. 2 is a view showing a resource grid with respect to one downlink slot according to one embodiment of the present invention.

As shown in FIG. 2, a downlink slot includes a plurality of OFDM symbols in a time domain, and a plurality of RBs in a frequency domain. The number of OFDM symbols included in one slot may be variable according to a configuration of a cyclic prefix (CP). FIG. 2 shows a normal CP, in which the number of OFDM symbols included in one slot is seven. In case of an extended CP, a length of one OFDM symbol is increased. Accordingly, the number of OFDM symbols included in one slot may be six less than that in case of a normal CP. When a channel state is unstable, e.g., in a case that a UE moves with a high speed, an extended CP may be used so as to reduce intersymbol interference (ISI).

Referring to FIG. 2, one downlink slot includes seven OFDM symbols, and one RB includes 12 subcarriers. Each element on a resource grid is called a resource element (RE), and one RB includes 84 (=12 subcarriers×7 OFDM symbols) resource elements. An interval between the subcarriers is 15 KHz, and one RB includes about 180 KHz in a frequency domain. Referring to FIG. 2, NDL indicates the number of RBs included in a downlink slot, and is dependent on a downlink transmission bandwidth set by scheduling of a base station.

As shown in FIG. 2, in case of a normal CP, one subframe consists of 14 OFDM symbols. The first two or three OFDM symbols of each subframe may be allocated to a physical downlink control channel (PDCCH), and the rest OFDM symbols may be allocated to a physical downlink shared channel (PDSCH).

Figure 3:
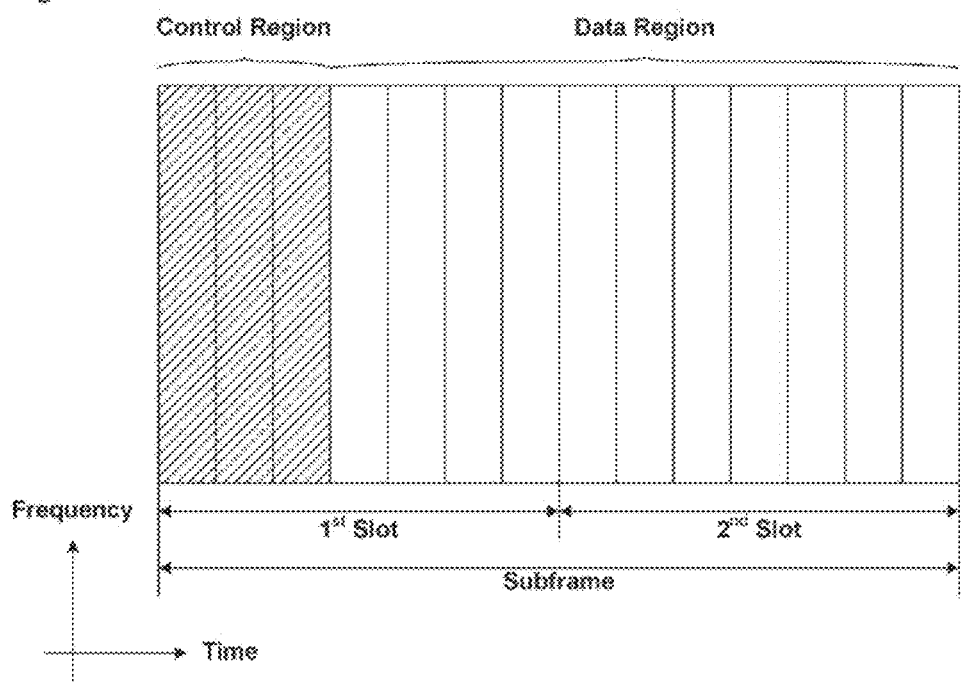
FIG. 3 is a view showing a structure of a downlink subframe according to one embodiment of the present invention.

FIG. 3 is a view showing a structure of a downlink subframe according to one embodiment of the present invention.

As shown in FIG. 3, maximum three OFDM symbols positioned at a head portion of a first slot inside one subframe are allocated to a control channel as a control region, and the rest OFDM symbols are allocated to a data channel (e.g., PDSCH) as a data region. The control channel may be a physical control format indicator channel (PCFICH), a physical downlink control channel (PDCCH), a physical hybrid ARQ indicator channel (PHICH), etc.

Figure 4:
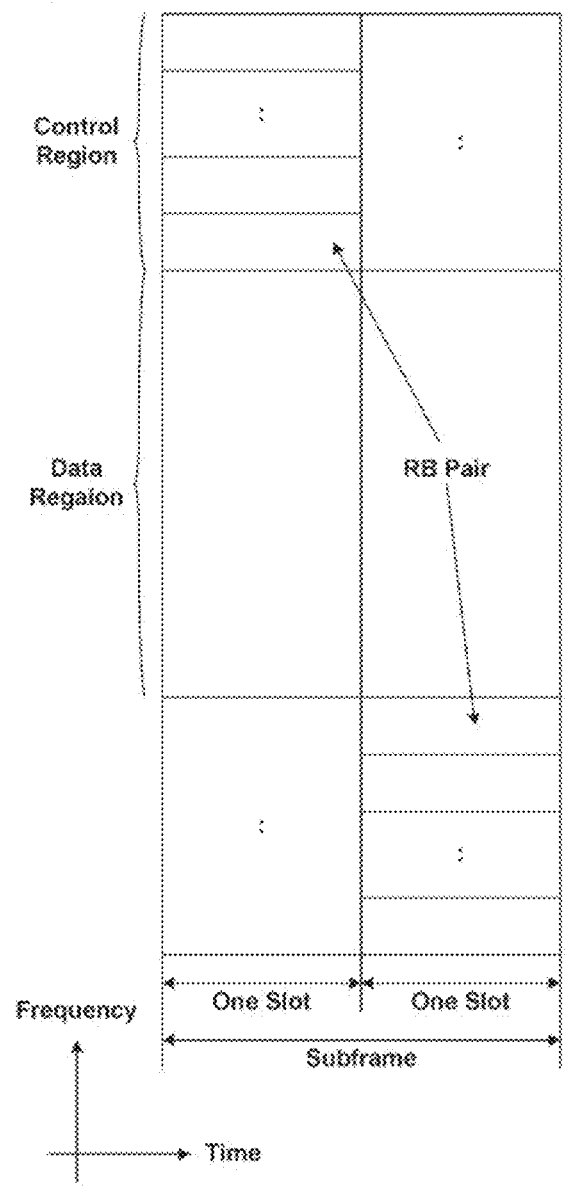
FIG. 4 is a view showing a structure of an uplink subframe according to one embodiment of the present invention.

FIG. 4 is a view showing a structure of an uplink subframe according to one embodiment of the present invention.

Referring to FIG. 4, an uplink subframe includes a control region and a data region in a frequency domain. A physical uplink control channel (PUCCH) for transmitting uplink control information is allocated to the control region, and a physical uplink shared channel (PUSCH) for transmitting user data is allocated to the data region.

A PUCCH of one UE is allocated to RB pair(s) in one subframe, and RBs included in RB pairs are positioned at different subcarriers in two slots.

Hereinafter, a downlink reference signal will be explained in more detail.

In a 3GPP LTE system, two types of downlink reference signals are defined for a unicast service. One is a common RS (cell-specific RS; CRS), and another is a dedicated RS (UE-specific RS; DRS).

The CRS is a reference signal shared by all UEs inside a cell, and is used to acquire information on a channel state and to measure a handover, etc. On the other hand, the DRS is a reference signal of a specific UE, and is used to demodulate data.

The CRS is a cell-specific reference signal, and the DRS is a UE-specific reference signal.

The UE measures the CRS, and provides feedback information such as channel quality information (CQI), a pecoding matrix indicator (PMI) and a rank indicator (RI) to the base station. Then, the base station performs scheduling about a downlink frequency domain based on the feedback information received from the UE.

In order to transmit a reference signal to the UE, the base station allocates resources to the reference signal with consideration of the amount of radio resources allocated to the reference signal, exclusive positions of the CRS and the DRS, positions of a synchronization channel (SCH) and a broadcast channel (BCH), a density of a DRS, and so on.

If a large amount of resources are allocated to the reference signal, a high channel estimation performance is obtained, but a data transmission ratio is lowered. On the other hand, if a small amount of resources are allocated to the reference signal, a data transmission ratio is increased, but a channel estimation performance may be degraded due to a low density of the reference signal. Accordingly, efficient resource allocations to a reference signal with consideration of channel estimation, a data transmission ratio, etc. are very important in a system performance.

In a 3GPP LTE system, the DRS is used only for data demodulation, whereas the CRS is used for both channel information acquisition and data demodulation. Especially, the CRS is transmitted per subframe over a broadband, and is transmitted according to each antenna port of a base station. For instance, when a base station has two transmit antennas, CRSs for antenna ports 0 and 1 are transmitted. As another example, when a base station has four transmit antennas, CRSs for antenna ports 0~3 are transmitted.

Figure 5:
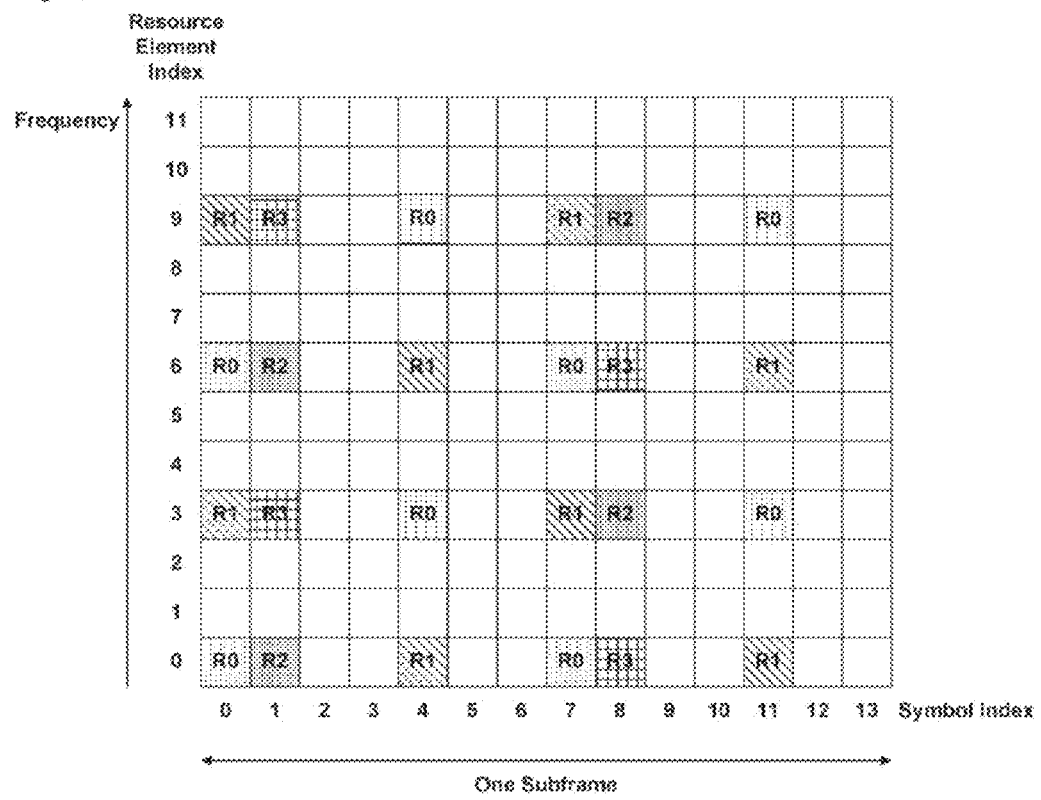
FIG. 5 is a view showing a resource allocation pattern of a common reference signal according to one embodiment of the present invention.

FIG. 5 is a view showing a resource allocation pattern of a common reference signal according to one embodiment of the present invention. In FIG. 5, it is assumed that a base station has four transmit antennas.

The CRS is transmitted per subframe over a broadband, and is transmitted according to each antenna port of a base station.

Referring to FIG. 5, when a base station has four transmit antennas, R0, R1, R2 and R3 of four transmit antenna ports are transmitted to one RB.

When the CRS corresponds to (is mapped onto) resources in time and frequency domains, a CRS of one antenna port in a frequency domain is mapped with an interval of six resource elements (RE) thus to be transmitted. Since one RB consists of twelve REs in a frequency domain, the number of REs for transmitting a reference signal of one antenna port is two per RB.

Figure 6:
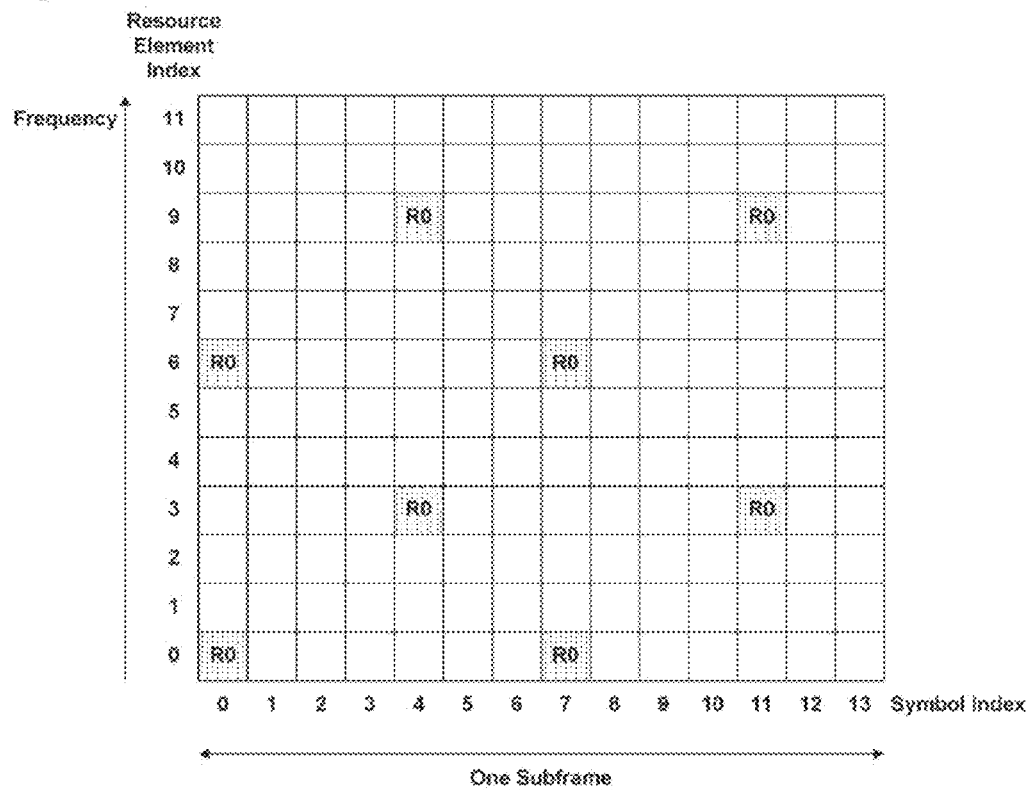
FIG. 6 is a view showing a pattern of a common reference signal ('R0') of an antenna port '0' in a resource allocation pattern of a common reference signal according to one embodiment of the present invention.

FIG. 6 is a view showing a pattern of a common reference signal ('RO') for an antenna port 0 in a resource allocation pattern of a common reference signal according to one embodiment of the present invention.

Referring to FIG. 6, a reference signal, 'RO' is mapped onto two resource elements with an interval of six resource elements of one resource block in a frequency domain.

So far, a downlink reference signal in the 3GPP LTE system was explained. Hereinafter, a downlink reference signal in the 3GPP LTE-A system will be explained in more detail.

In the LTE-A system, a system advanced from the 3GPP LTE system, it is required to support maximum eight transmit antennas through a downlink when transmitting data from a base station to a UE. Accordingly, a CRS has to be supported with respect to each of the maximum of eight transmit antennas. In the LTE system, only downlink reference signals of maximum four antenna ports are defined. Accordingly, in a case that a base station has 5~8 downlink transmit antennas in the LTE-A system, reference signals for the antenna ports have to be additionally defined. Furthermore, in case of supporting maximum eight transmit antennas, not only a CRS for channel estimation but also a DRS for data demodulation have to be newly defined.

One of factors to be considered when designing the LTE-A system is backward compatibility, which means the LTE-A system has to support an LTE UE so that the LTE UE can operate without a difficulty in the LTE-A system. In the aspect of reference signal transmission, common reference signals for maximum eight transmit antenna ports have to be additionally defined in time and frequency domains where the common reference signals defined in the LTE-A system are transmitted to a broadband per subframe. However, if a reference signal pattern of maximum eight transmit antenna ports is added to the entire bandwidth per subframe in the LTE-A system like in the conventional LTE system, a transmission overhead of a reference signal is excessively increased.

A reference signal newly designed in the LTE-A system may be classified into two types. One is a channel state information RS, a channel state indication RS (CSI-RS) for selecting a modulation and coding scheme (MCS), a precoding matrix index (PMI), etc., and another is a data demodulation RS (DM-RS) for demodulating data transmitted to maximum eight transmit antennas. The CSI-RS is mainly used to implement channel measurement, which is different from the conventional CRS used not only to perform channel measurement and handover measurement, but also to modulate data. Here, the CSI-RS may be also used to measure a handover.

The CSI-RS is transmitted in order to acquire information on a channel state. Accordingly, the CSI-RS needs not be transmitted per subframe differently from a CRS. In order to reduce a transmission overhead of a reference signal, the CSI-RS is intermittently transmitted in a time domain. For data demodulation, a dedicated DM-RS is transmitted to a UE scheduled in corresponding time and frequency domains. That is, a DM-RS for a specific UE is transmitted only in a domain where a corresponding UE has been scheduled (time and frequency domains where a corresponding UE receives data).

Hereinafter, with reference to FIGS. 13 to 17, will be explained a method and apparatus for transmitting a CSI-RS capable of reducing a CSI-RS transmission overhead and capable of smoothly transmitting and measuring CSI-RSs in a communication system of a single cell communication environment or a cooperative multipoint transmission environment.

The base station has to transmit a CSI-RS of each antenna port. In case of transmitting CSI-RSs for maximum eight transmit antennas per subframe, an overhead is too large. Accordingly, the base station does not transmit CSI-RSs per subframe, but transmits the CSI-RSs intermittently in a time domain thereby to reduce an overhead. More concretely, the base station may transmit CSI-RSs with a period of integer times of one subframe, or according to a specific transmission pattern. Here, the period or pattern of CSI-RSs transmitted by the base station may be set by the base station.

On the other hand, the UE has to know information on a time-frequency position, a sequence, a frequency shift, etc. of a CSI-RS of each antenna port of a cell to which itself belongs so as to measure CSI-RSs.

In an LTE system, a sequence, a time-frequency position, a frequency shift, etc. of a CRS are fixed by a cell-ID, a subframe number, and a symbol number. However, in the LTE-A system, information on a CSI-RS period, a transmission offset, a CSI-RS transmission offset according to each antenna port, etc. is additionally required so as to transmit a CSI-RS. In order for the UE to precisely acquire a CSI-RS, the base station has to provide the information to the UE.

In case of providing CSI-RS offset information according to each antenna port, the LTE-A system may full-signals CSI-RS information of one antenna port, and may provide a CSI-RS position of another antenna port from a CSI-RS position of one antenna port as an offset. Here, the CSI-RS offset information according to each antenna port may be an offset of a symbol or frequency unit in one subframe, or may be an offset of a subframe unit.

Required is a method capable of reducing a transmission overhead of a reference signal, and capable of efficiently transmitting information on a position of the reference signal in time and frequency domains (hereinafter, will be called 'reference signal position information') to a UE by a base station. Hereinafter, it is assumed that an LTE-A system is implemented as a communication system, and a CSI-RS is implemented as a reference signal. However, it should be noted that this is merely exemplary, and the present invention is not limited to this.

A position in time and frequency domains of a resource element (RE) to which a reference signal is allocated is defined in the form of a standardization in a process of designing a communication system. This position is generally represented in the form of a pattern according to a logical and mathematical rule. For instance, two resource blocks (RB) are set as a basic unit for CSI-RS allocation in a subframe including a plurality of RBs, and CSI-RSs may be allocated to the two RBs set with an interval of eight REs. Here, CSI-RSs for a plurality of antennas are allocated to different REs. It is assumed that a position of a RE in time and frequency domains, the RE to which a reference signal is allocated, is defined according to a predetermined logical and mathematical rule.

A CSI-RS transmitting method may be considered in two aspects. One aspect relates to a CSI-RS transmitting method in a time domain. Here, required reference signal position information may be different according to whether a CSI-RS of one base station is completely transmitted in one subframe, or is transmitted to two or more subframes. Another aspect relates to a method for notifying reference signal position information. Here, a broadcasting method or a radio resource control (RRC) signaling method may be used. Hereinafter, a CSI-RS transmitting method in a time domain will be explained.

A CSI-RS Transmitting Method in a Time Domain

In an LTE-A system, a base station has to transmit CSI-RSs for maximum eight antenna ports. Radio resources used to transmit CSI-RSs of different antenna ports have to be orthogonal to each other. For this, the base station uses a frequency division multiplexing (FDM) scheme for allocating CSI-RSs of the respective antenna ports to different frequencies. Alternatively, the base station may transmit CSI-RSs by a code division multiplexing (CDM) scheme for mapping CSI-RSs with respect to codes orthogonal to each other.

Firstly, a CSI-RS transmitting method based on a CDM scheme will be explained. As aforementioned, CSI-RSs for a plurality of antenna ports of one base station may be transmitted by using different codes with respect to the respective antenna ports. In this case, the number of resource elements used to transmit a CSI-RS of one antenna port is preferably 1~2 per resource block (RB). Preferably, CSI-RSs for all the antenna ports are simultaneously transmitted to one subframe in order to distinguish maximum eight antenna ports from one another.

Secondly, a CSI-RS transmitting method based on a FDM scheme will be explained. The base station transmits CSI-RSs of a plurality of antenna ports to the UE by corresponding the CSI-RSs to different resource elements. Preferably, a CSI-RS of one antenna port occupies 1~2 REs per resource block (RB). In the LTE-A system, CSI-RSs of maximum eight antenna ports have to be transmitted. Accordingly, approximately 16 REs are required per CSI-RS period in order to support eight transmit antennas. Even if the CDM scheme is used to distinguish antenna ports from one another, a similar number of REs (16) are required for CSI-RS mapping.

If a CSI-RS of one antenna port is mapped with an interval of 6REs as shown in FIGS. 5 and 6, the number of CSI-RSs that can be transmitted in one symbol is six to the maximum, because a frequency domain of one RB consists of 12REs. This may cause the number of available REs to be less than the number of REs of CSI-RSs for supporting eight transmit antennas.

The present invention proposes a pattern that resources of a CSI-RS of one antenna port have an interval of at least 6REs, preferably, an interval of 8REs in a frequency domain.

Since resource mapping of a CSI-RS of one antenna port has an interval more than 6REs, a basic unit for CSI-RS allocation and transmission is implemented as a unit of a plurality of RBs, not a unit of one RB.

For instance, when a resource element of a CSI-RS of one antenna port is mapped with an interval of 8REs, a basic unit for CSI-RS allocation and transmission is implemented as a unit of two RBs. And, a CSI-RS of one antenna port is transmitted by being mapped onto three REs per two RBs.

Figure 7:
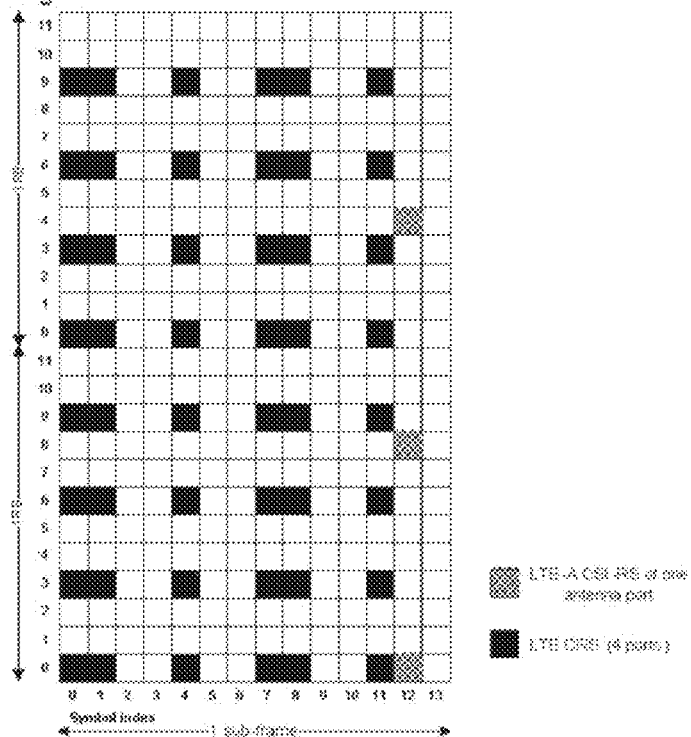
FIG. 7 is a view showing a CSI-RS pattern having an interval of '8RE' according to one embodiment of the present invention.

FIG. 7 is a view showing a CSI-RS pattern having an interval of 8REs according to one embodiment of the present invention. For convenience, FIG. 7 illustrates only a CSI-RS of one antenna port. If a CSI-RS has an interval of at least 6REs, the number of REs used to transmit a CSI-RS per RB becomes different. Accordingly, the number of REs allocated to the UE for data transmission also becomes different.

If a CSI-RS of each antenna port is mapped onto REs with an interval of 8RE, the number of REs used to transmit a CSI-RS per RB becomes different according to a number of a resource block. More concretely, if the number of REs of a CSI-RS allocated to an even numbered RB for a specific antenna port is '1', the number of REs of a CSI-RS allocated to an odd numbered RB is '2'.

As a result, the number of REs used by a channel estimator of the UE for channel estimation also becomes different according to a number of a RB.

In one RB, data is allocated to redundant REs obtained by excluding REs used for a control signal, a CRS and a CRI-RS from the entire REs. Accordingly, the number of REs per RB, the REs used for data transmission is variable with consideration of RE mapping. More concretely, the number of REs allocated for data transmission in an even numbered RB is different from the number of REs allocated for data transmission in an odd numbered RB. Therefore, the number of REs used to transmit control information becomes different according to a number of an RB (an odd or even numbered RB in the preferred embodiment). As a result, the number of REs used to transmit data information becomes different according to a number of an RB (an odd or even numbered RB in the preferred embodiment).

According to another embodiment of the present invention, various intervals for CSI-RS transmission, such as 7REs, 9REs or 10REs rather than the 8REs shown in FIG. 7 may be used. That is, when it is assumed that a least common multiple of 'K' and 12 ('K' is an arbitrary integer, and 1RB=12REs) is 'M', a CSI-RS is repeatedly transmitted in a frequency domain with an interval of 'K REs', that is, M/12 RB.

Here, if the 'K' is an integer more than six, a period of a CSI-RS transmission pattern is a plurality of RBs.

Referring to FIG. 7, in an assumption that a transmission pattern (K) of a CSI-RS is 8 RE, a least common multiple (M) of 8 and 12 is 24. And, a basic period of an RB, a transmission pattern of a CSI-RS is 2 RB (24/12 RB).

If a CSI-RS pattern is repeated with a period of a plurality of RBs, the number of REs used for CSI-RS transmission becomes different according to each RB. For instance, the number of RBs which form a period of a CSI-RS pattern is 'N' (=M/12), and the 'N' is set as a CSI-RS period in a frequency domain. Here, each of 'N' RBs with one CSI-RS period has a different number and position of REs used for CSI-RS transmission. Accordingly, a position and the number of REs allocated for transmission of a data signal of a UE become different according to each RB within one period.

And, the number of REs allocated for transmission of a control signal of a UE becomes different according to each RB within one period.

Therefore, the channel estimator of the UE has to perform channel estimation by using a different number and pattern of REs according to each of 'N' RBs within one period.

A CSI-RS pattern is repeated with the period of the 'N'RBs through all bands in a frequency domain.

Figure 8:
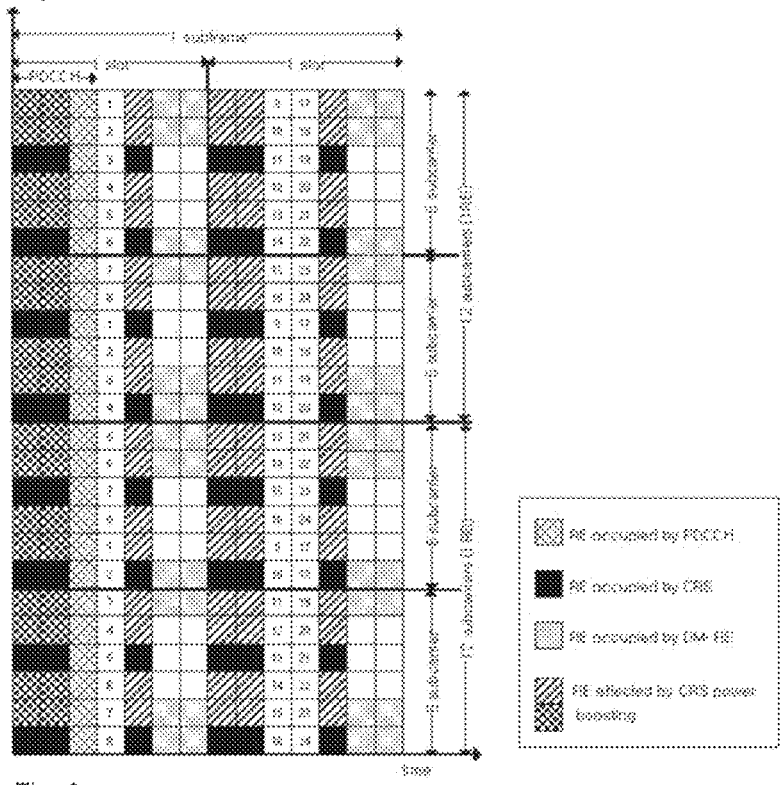
FIG. 8 is a view showing a CSI-RS pattern in a case that 24 resource elements are used for DM-RS transmission according to one embodiment of the present invention.

FIG. 8 is a view showing a CSI-RS pattern in a case that 24 resource elements are used for DM-RS transmission according to one embodiment of the present invention.

FIG. 8 illustrates a CSI-RS pattern with a period of a plurality of RBs, in which 24 REs in one RB are used for DM-RS transmission. FIG. 8 illustrates a preferred embodiment of a CSI-RS transmission pattern by a normal CP in case of transmitting CRSs for four antenna ports.

As shown, a CSI-RS pattern for one antenna port is implemented such that CSI-RSs are transmitted with an interval of 8REs in one OFDM symbol, and the same CSI-RS pattern is repeated as a unit of 2RBs in a frequency domain. The same symbol indexes as those of FIG. 7 are used in FIG. 8, and the same numbers among numbers written on a plurality of REs may be a CSI-RS set for one antenna port. Maximum 24 CSI-RS sets may be obtained per 2RBs. In this preferred embodiment, it is assumed that a CSI-RS is transmitted in the rest symbol sections rather than a symbol section for control information transmission, a symbol section for CRS transmission, and a symbol section for DM-RS transmission. For instance, CSI-RSs of FIG. 8 may be transmitted to symbols having indexes of 3, 9 and 10. As this symbol index, the symbol index used in FIG. 7 is used.

Figure 9:
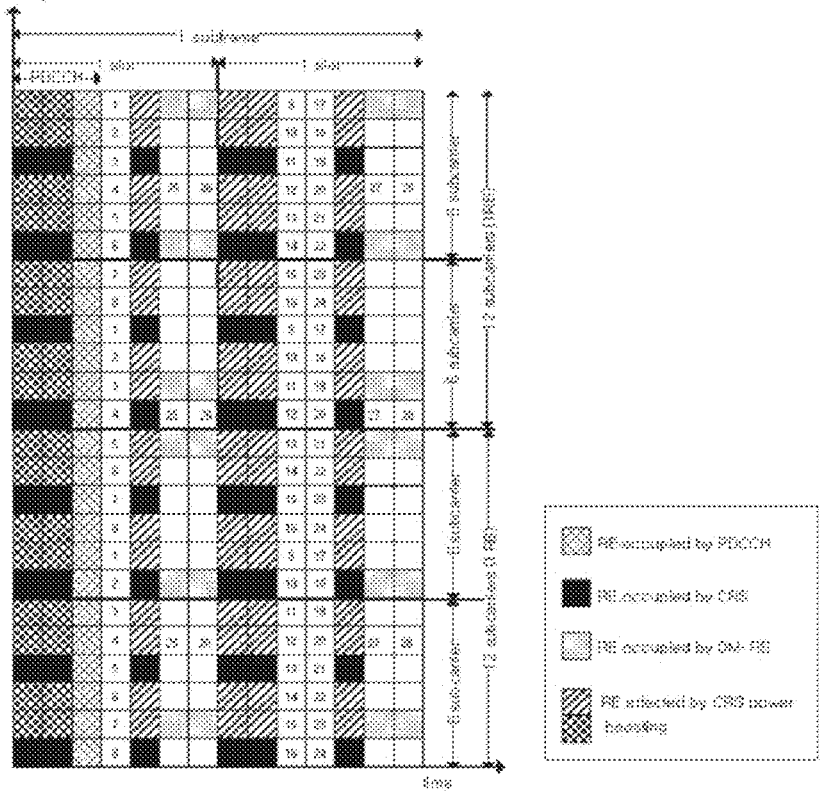
FIG. 9 is a view showing a CSI-RS pattern in a case that 12 resource elements are used for DM-RS transmission according to another embodiment of the present invention.

FIG. 9 is a view showing a CSI-RS pattern in a case that 12 resource elements are used for DM-RS transmission according to another embodiment of the present invention.

In a case that 12 REs are used for DM-RS transmission, 28 sets of REs to which CSI-RSs can be transmitted are obtained per 2RB.

However, a CSI-RS set number shown in FIGS. 8 and 9 is not absolute, but indicates an RE set to which a CSI-RS of one antenna port can be transmitted. The number may be variously modified.

According to one embodiment of the present invention, the CSI-RS transmission pattern may be implemented by using a different set according to each cell. In some cases, a CSI-RS transmission position may be differently configured according to each subframe.

Preferably, a CSI-RS transmission reference position of an antenna port has to be defined according to each cell. The CSI-RS position may be signaled to the UE from the base station as the CSI-RS set number of FIG. 8 or 9 according to the number of REs used for DM-RS transmission.

In order to signal a reference position of a cell-specific CSI-RS, the base station transmits, to the UE, a reference position of a specific antenna port or antenna port group, and values corresponding to time/frequency offsets of the rest antenna ports or antenna port groups, or values corresponding to CSI-RS time/frequency offsets. As shown in FIGS. 8 and 9, the base station signals a difference between CSI-RS set numbers to the UE, and transmits a CSI-RS to a corresponding position. In some cases, CSI-RS sets not overlapping each other with respect to the entire antenna ports may be selected to be signaled.

Figure 10:
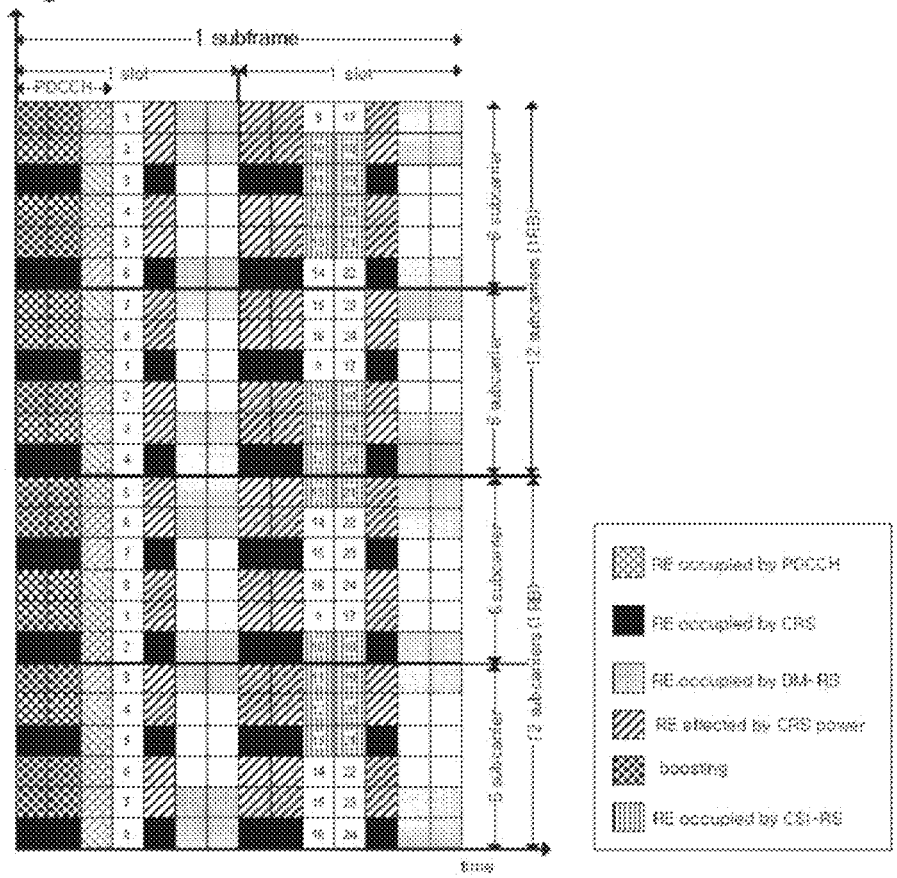
FIG. 10 is a view showing a CSI-RS transmission pattern for 8 antenna ports according to one embodiment of the present invention.

FIG. 10 is a view showing a CSI-RS transmission pattern for 8 antenna ports according to one embodiment of the present invention.

As shown in FIG. 10, with respect to eight antennas, an antenna 0 transmits a CSI-RS to an RE set 10, an antenna 1 transmits a CSI-RS to an RE set 11, an antenna 2 transmits a CSI-RS to an RE set 12, an antenna 3 transmits a CSI-RS to an RE set 13, an antenna 4 transmits a CSI-RS to an RE set 18, an antenna 5 transmits a CSI-RS to an RE set 19, an antenna 6 transmits a CSI-RS to an RE set 20, and an antenna 7 transmits a CSI-RS to an RE set 21. In case of allocating and transmitting a CSI-RS of each antenna, each CSI-RS transmission position may be informed to the UE as follows. For instance, a CSI-RS reference position of an antennae port 0 corresponds to an RE set 10, and CSI-RS reference positions of the rest antenna ports (antenna ports 1~3) correspond to RE sets shifted by 1~3. And, the base station informs to the UE that CSI-RS reference positions of the rest antenna ports (antenna ports 4~7) correspond to RE sets shifted by 8~11.

Information on the CSI-RS transmission position of each antenna may be generalized as follows.

The CSI-RS transmission position of each antenna port is defined as Pi (i=0, 1, 2, . . . N–1: N indicates the number of CSI-RS antenna ports). It is assumed that a CSI-RS transmission reference position of an antenna port 0 is a CSI-RS position set 10. In this case, CSI-RS transmission positions of for another antenna ports are determined in a manner of the following Equation 1.

$$P_0 = 10$$

$$\text{For } (0 < i \leq 3) \ P_i = P_{i-1} + a_i;$$

$$P_4 = P_0 + 8$$

$$\text{For } (4 < i < 8) \ P_i P_{i-1} + a_i \quad \text{[Equation 1]}$$

Referring to the Equation 1, the 'ai' indicates an offset between 'Pi' and 'Pi–1', and is set as '1' except a case of 'i=4' in FIG. 10.

According to another embodiment of the present invention, a reference position of a CSI-RS of one antenna port may be provided. And, CSI-RS positions of the rest antenna ports may be selected so as to have random offsets not overlapping each other for a cell-specific and antenna specific pattern with respect to the reference position. Here, the CSR-RS positions of the rest antenna ports are dependent on a determined reference position.

In order to provide a CSI-RS position of an antenna port to a UE, a base station may signal a CSI-RS reference position of a reference antenna port to the UE. Then, the base station may signal, to the UE, CSI-RS positions of the rest antenna ports, relative positions with respect to the reference position, i.e., information on time/frequency shift or offset.

In case of signaling a CSI-RS position of a group of a plurality of antenna ports, a CSI-RS reference position of a reference antenna port group may be provided. And, CSI-RS positions of the rest antenna groups may be signaled as offsets for a position of the first antenna group and CSI-RS positions of other antenna ports within a corresponding group, and may be randomly selected so as not to overlap the position of the first antenna group and CSI-RS positions of other antenna ports within a corresponding group. In this case, the CSI-RS positions of the rest antenna groups are cell-specific and antenna-specific, and are dependent on a CSI-RS position of one arbitrary antenna port in the first antenna port group.

In order to provide a CSI-RS position of an antenna port to the UE, the base station may signal a CSI-RS reference position of one antenna port group to the UE. Then, the base station may signal, to the UE, CSI-RS positions of the rest antenna port groups, relative positions with respect to the reference position, i.e., information on time/frequency shift or offset.

For instance, if antenna ports 0~3 belong to one group and antenna ports 4~7 belong to another group with respect to 8 CSI-RS antenna ports, selected are CSI-RS sets where CSI-RS reference positions of the group of the antenna ports 0~3 do not overlap one another. Referring to FIG. 10, CSI-RS reference positions of the group of the antenna ports 0~3 are informed to CSI-RS sets 10~13, and CSI-RS positions of the group of the antenna ports 4~7 are informed to positions shifted by 8 from the first antenna port group.

According to another embodiment of the present invention, as a method for informing a CSI-RS transmission position to the UE, the base station may select a set of CSI-RS positions of all antenna ports to which CSI-RSs are transmitted, the CSI-RS positions not overlapping each other, and then signal the CSI-RS positions.

In order to enhance a channel estimation performance, CSI-RSs between cells have to be designed so as not to overlap each other in the same time/frequency domains.

According to one embodiment of the present invention, there is provided a method for multiplexing CSI-RSs between cells by time division multiplexing (TDM) of a subframe unit. For orthogonal multiplexing between cells for CSI-RS transmission in the same subframe, different resource elements (RE) have to be allocated for CSI-RS transmission. For this, each cell has to be provided with a different reference position of a CSI-RS transmitted to the same subframe. And, information on time/frequency shift or offset has to be set so that a CSI-RS transmission position of one cell can not overlap a CSI-RS transmission position of a neighboring cell.

However, when considering a heterogeneous network where not only a macro eNB but also a relay, a femto eNB, a Home eNB, a picl eNB, etc. coexist, orthogonality of CSI-RSs between cells cannot be always ensured.

Referring to a CoMP system aforementioned in the background art, a CoMP cluster is firstly defined so as to perform a CoMP operation. CSI-RSs between cells in the CoMP cluster are orthogonal to each other, and the UE has to respectively measure channel information on other cells in the CoMP cluster. For orthogonal multiplexing of CSI-RSs between cells in the CoMP cluster, a resource element (RE) of other cell for CSI-RS transmission in the CoMP cluster has to be in an empty state with no received data. That is, the corresponding RE has to undergo a muting process (nulling or puncturing process).

That is, the UE has to know a CSI-RS transmission pattern of a serving cell, and has to know positions of CSI-RSs transmitted by other cells which perform the CoMP operation. The UE which performs the CoMP operation has to know CSI-RS positions and patterns of other cells inside the CoMP cluster, and has to know that CSI-RS transmission resources of other cells rather than the serving cell are muted without receiving data. For this, information on a CSI-RS pattern/position of a serving cell from the base station to the UE, and CSI-RS patterns/positions of other cells inside the CoMP cluster have to be signaled. However, combinations of cells which perform a CoMP operation in the CoMP cluster may be variable according to a UE, a UE position, and a channel state. Therefore, all UEs need not know precise CSI-RS positions/patterns of cells inside the CoMP cluster. Accordingly, the present invention proposes a method capable of informing a CSI-RS period of cells inside the CoMP cluster, a time offset, and REs to which CSI-RSs are transmitted so as to reduce a difficulty of signaling, and capable of providing information on a CSI-RS pattern/position of a serving cell. According to this method, the UE can know that the rest REs are muted without receiving data from the base station, the rest REs rather than an RE to which a CSI-RS of the UE's serving cell can be transmitted among the entire REs to which CSI-RSs of all cells inside the CoMP cluster can be transmitted. In case of substantially performing a CoMP operation with specific cells, the UE has to receive CSI-RS information of the corresponding cells from the serving cell.

Furthermore, there is required a method for CSI-RS multiplexing of cells which belong to different CoMP clusters or which do not perform a CoMP operation. That is, it is preferable to design CSI-RS positions so that CSI-RSs between base stations which do not perform a CoMP operation, or CSI-RSs between neighboring cells which belong to different CoMP clusters can not continuously collide with each other. In a case that CSI-RSs between two cells collide with each other by accident, if positions of the CSI-RSs are equal to each other in each subframe and CSI-RS periods are equal to each other, the CSI-RSs of the two cells always collide with each other. This may cause degradation of a channel estimation performance. Especially, when CSI-RSs are transmitted with power higher than that in general data transmission due to power boosting, the channel estimation performance is more degraded. Furthermore, if CSI-RSs of small cells (Home eNB, Pico cell, Femto cell) for transmitting downlink signals with low power in a heterogeneous network continuously collide with a CSI-RS of a Macro eNB, severe influences may be caused.

Accordingly, there is provided a method for randomizing a position of a CSI-RS according to each cell and each subframe so that CSI-RSs between cells which belong to different CoMP clusters, or CSI-RSs between cells which do not perform a CoMP operation can not continuously overlap a CSI-RS of the cell where the collision has occurred. The present invention proposes a method for orthogonally multiplexing CSI-RSs between cells which belong to the same CoMP cluster, and for randomly multiplexing CSI-RSs between cells which belong to different CoMP clusters.

The proposed method according to one preferred embodiment of the present invention may be configured such that CSI-RSs between cells which belong to different CoMP clusters are randomly multiplexed, and CSI-RSs are randomly hopped according to a subframe time and a CSI-RS period. Here, a CSI-RS hopping pattern is configured to be cell-specific and antenna port-specific.

Accordingly, the base station informs, to the UE, a subframe to which a CSI-RS is transmitted over the entire network, a CSI-RS period, a time offset, an RE to which a CSI-RS is transmitted, and/or a CSI-RS pattern of a serving cell.

Through the CSI-RS pattern transmitted from the base station, the UE can check that data is not transmitted from the base station to the rest REs and the rest REs are muted, the rest REs rather than an RE to which a CSI-RS of a serving cell is transmitted among the entire CSI-RS transmission RE positions on the entire network.

According to another embodiment of the present invention, the base station may inform, to the UE, a subset of neighboring cells rather than the entire network, or a subset of cells inside a network, i.e., positions of REs to which CSI-RSs of cells which belong to the same CoMP cluster are transmitted. And, the base station may inform a CSI-RS pattern of a serving cell.

Likewise, the base station mutes REs corresponding to CSI-RS transmission positions of other cells inside the same CoMP cluster.

However, in a case that cells inside the CoMP cluster substantially perform a CoMP operation, the base station has to additionally inform, to the UE, cells to be measured by the UE, i.e., a cell ID and a CSI-RS position/pattern for a CoMP operation.

In order to support orthogonal multiplexing with allowing CSI-RSs to be randomly hopped, subframes to which CSI-RSs are transmitted have to be aligned between all cells or neighboring cells. That is, cells in the same cluster have to transmit CSI-RSs to the same subframe. CSI-RS orthogonal multiplexing among a plurality of cells may be implemented by muting other REs rather than REs to which the base station transmits CSI-RSs among all REs to which CSI-RSs can be transmitted.

Alternatively, it may be configured that CSI-RSs are randomly hopped as a subframe unit or with a CSI-RS period with respect to all REs to which CSI-RSs can be transmitted. However, muting the rest REs rather than REs to which CSI-RSs are allocated to be transmitted, by the base station, with respect to all CSI-RS sets 1~24 of FIG. 8 to which CSI-RSs can be transmitted may cause an excessive CSI-RS overhead.

Preferably, designated is a CSI-RS RE set to which CSI-RSs can be transmitted between cell groups adjacent to each other or having interference more than a predetermined threshold between base stations, or cells inside a CoMP cooperating set, i.e., between cells inside the CoMP cluster.

Referring to FIG. 8, for specific cell (eNB) groups, CSI-RSs are transmitted only to the CSI-RS sets 1~12 among the entire CSI-RS sets 1~24. For the rest cell groups, CSI-RSs are transmitted to the CSI-RS sets 13~24. That is, CSI-RS sets to which CSI-RSs are to be transmitted are grouped according to each CoMP cluster.

Here, a cell group allocated with the CSI-RS sets 1~12 mutes REs inside other CSI-RS set rather than its CSI-RS set, but may transmit downlink data to the CSI-RS sets 13~24. Likewise, a cell group allocated with the CSI-RS sets 13~24 transmits data to the CSI-RS sets 1~12, but mutes the rest REs rather than its REs inside the CSI-RS sets 13~24 to which CSI-RSs are transmitted. CSI-RS hopping of cells inside a cell group may be implemented inside an allocated CSI-RS group. Here, the allocated CSI-RS group (set having a number) may be different according to a subframe or a CSI-RS period. More concretely, cells requiring CSI-RS coordination therebetween are grouped as one group for CSI-RS transmission, and positions of REs to which CSI-RSs can be transmitted are allocated for transmission of CSI-RSs of cells inside a corresponding cell group. Then, the cells inside the corresponding cell group transmit CSI-RSs to the corresponding positions. At the same time, within the corresponding positions, the cell mutes the rest REs to which its CSI-RSs are transmitted without transmitting data thereto. Hopping of a CSI-RS transmission pattern of the cell is performed within the corresponding positions. Here, the corresponding positions may be configured so as to be hopped.

Figure 11:
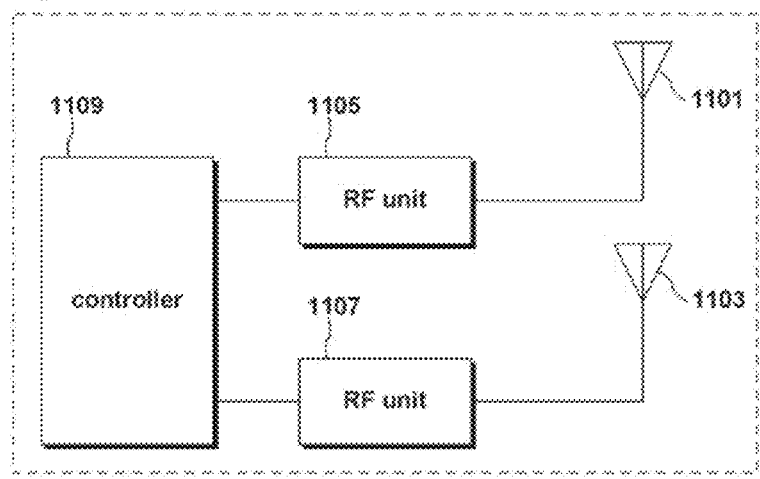
FIG. 11 is a block diagram schematically showing an apparatus for transmitting a reference signal according to one embodiment of the present invention.
Figure 12:
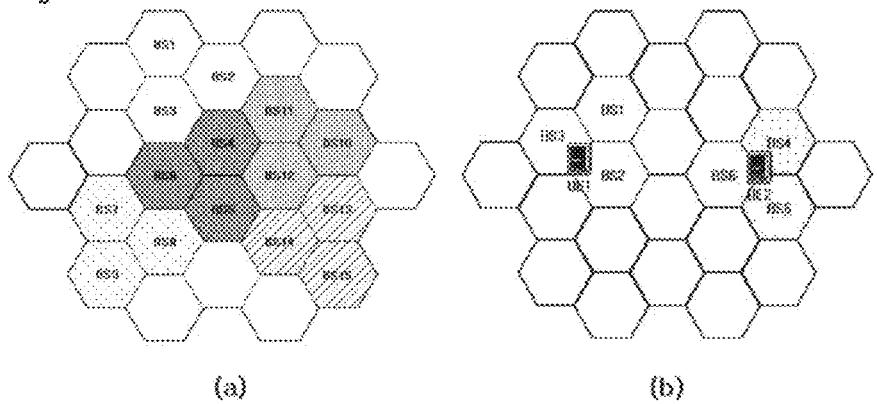
FIG. 12 is a view schematically showing a method for configuring a CoMP cluster.

FIG. 11 is a block diagram schematically showing an apparatus for transmitting a reference signal according to one embodiment of the present invention.

The apparatus according to one embodiment of the present invention transmits a Channel State Information-Reference Signal (CSI-RS) for measuring a transmission channel according to each antenna and a data signal in a broadband wireless communication system based on a MIMO scheme through a plurality of antennas.

The apparatus comprises a plurality of transmit antennas 1101 and 1103, RF transmitters 1105 and 1107 configured to transmit a subframe onto which reference signals and data signals have been mapped, and a controller 1109 configured to map the CSI-RSs and the data signals of the transmit antennas 1101 and 1103 onto REs of the subframe.

The plurality of transmit antennas 1101 and 1103 consist of at least four antennas, preferably eight antennas.

The controller 1109 sets two RBs as a basic allocation unit for allocating a CSI-RS in a subframe including a plurality of RBs.

A CSI-RS of one antenna is mapped with an interval of 8 REs with respect to the two RBs set as a basic allocation unit, and each of the CSI-RSs of the plurality of transmit antennas is mapped onto a different frequency RE. Accordingly, the CSI-RSs are mapped such that the number of frequency REs in one RB is different from that in another RB, the frequency REs to which data signals are allocated.

Preferably, the CSI-RSs are periodically transmitted in a time domain with a period of specific integer times of one subframe. And, information on at least one of a RE mapping position, a CSI-RS period and a CSI-RS offset may be additionally signaled to be informed to the UE.

The base station punctures REs to which CSI-RSs are transmitted to a data transmission region of a physical downlink shared channel (PDSCH), and transmits CSI-RSs to the REs. Once the base station has transmitted CSI-RSs for all antenna ports to one subframe, a downlink transmission performance through the PDSCH may be badly influenced since maximum 16 REs per RB are used for CSI-RS transmission in the corresponding subframe.

In order to solve this problem, UEs are not scheduled to a subframe to which CSI-RSs are transmitted. Alternatively, UEs may be scheduled to a subframe to which CSI-RSs are transmitted with a low modulation and coding scheme (MCS). The reason is because a data performance of a corresponding UE may be severely degraded when a PDSCH of the UE is punctured in case of scheduling the UE with a high MCS by the base station. Still alternatively, the base station does not simultaneously transmit CSI-RSs for all antenna ports, but transmits the CSI-RSs to different subframes. This may minimize the number of REs punctured when transmitting CSI-RSs.

The UE can precisely acquire and measure CSI-RSs transmitted from the base station through information on positions in time and frequency domains to which CSI-RSs are transmitted. Accordingly, the base station has to inform, to the UE, information on positions in time and frequency domains to which CSI-RSs are transmitted. When notifying information on CSI-RSs to the UE by the base station, the base station has to firstly inform information on time/frequency onto which a CSI-RS of each antenna port is mapped. More concretely, the information on time/frequency may include a number of a subframe to which a CSI-RS is transmitted, a CSI-RS transmission symbol number of a specific antenna, a CSI-RS period, an offset of a subframe to which a CSI-RS is transmitted, an offset or shift of REs in a frequency domain, a frequency spacing, etc.

As aforementioned, CSI-RSs may be simultaneously transmitted to one subframe, or may be transmitted to a plurality of subframes. Hereinafter, time information which has to be informed to the UE by the base station when transmitting CSI-RSs will be explained with respect to the respective cases. Firstly, will be explained a method for simultaneously transmitting all CSI-RSs of one base station to one subframe.

Figure 13:
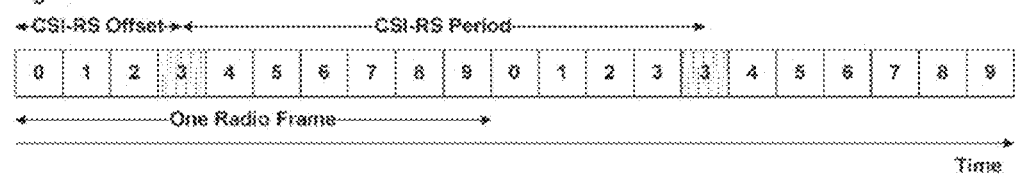
FIG. 13 is a view showing a case that CSI-RSs are simultaneously transmitted in one subframe in a CSI-RS transmitting method according to one embodiment of the present invention.

A Method for Simultaneously Transmitting all CSI-RSs of One Base Station to One Subframe FIG. 13 is a view showing a case that reference signals are simultaneously transmitted in one subframe in a CSI-RS transmitting method according to one embodiment of the present invention. Here, it is assumed that the reference signals are implemented as CSI-RSs.

Referring to FIG. 13, the base station transmits CSI-RSs with a CSI-RS period of 10 ms and with a CSI-RS offset of 3. The CSI-RS offset may be variable according to each base station (cell, access point). CSI-RSs of a plurality of cells may be evenly dispersed in a time domain by controlling the CSI-RS offset. In case of a base station which transmits CSI-RSs with a CSI-RS period of 10 ms, 10 offset values from an offset 0 to an offset 9 may be implemented. This offset value indicates a value of a subframe to which the base station substantially starts to transmit CSI-RSs with a specific CSI-RS period (i.e., an order of a subframe inside one frame). Once the base station informs a CSI-RS period and a CSI-RS offset, the UE measures CSI-RSs of the base station at a corresponding position indicated by the CSI-RS period and the CSI-RS offset. Then, the UE reports information on CQI, PMI, RI, etc. to the base station. The CSI-RS related information is cell-specific information.

Next, will be explained a method for transmitting CSI-RSs of one base station to a plurality of subframes in a dispersive manner.

Figure 14:
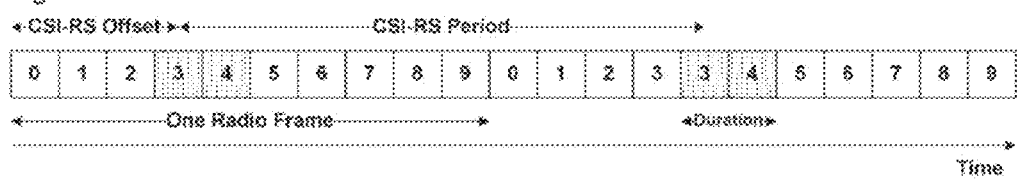
FIG. 14 is a view showing a case that CSI-RSs of one base station are transmitted to a plurality of subframes in a CSI-RS transmitting method according to one embodiment of the present invention.

A Method for Transmitting CSI-RSs of One Base Station to a Plurality of Subframes in a Dispersive Manner FIG. 14 is a view showing a case that reference signals of one base station are transmitted to a plurality of subframes in a CSI-RS transmitting method according to one embodiment of the present invention. Here, it is assumed that the reference signals are implemented as CSI-RSs.

Referring to FIG. 14, CSI-RSs are transmitted to a plurality of consecutive subframes. In this case, the base station has to inform, to the UE, a CSI-RS period, a CSI-RS offset, a duration for which CSI-RSs are transmitted to a plurality of subframes within one CSI-RS period, the number of subframes to which CSI-RSs have been allocated within a CSI-RS period, etc.

Referring to FIG. 14, the base station transmits CSI-RSs with a CSI-RS period of 10 ms, a CSI-RS off set of 3, and a duration of 2 subframes. The CSI-RS offset may be eNB-specific or cell-specific, for instance, may be variable according to each neighboring base station. CSI-RSs of a plurality of cells may be evenly dispersed in a time domain by controlling the CSI-RS offset. In case of a base station which transmits CSI-RSs with a CSI-RS period of 10 ms, 10 offset values from an offset 0 to an offset 9 may be implemented. This offset value indicates a value of a subframe to which the base station substantially starts to transmit CSI-RSs with a specific CSI-RS period (i.e., an order of a subframe inside one frame).

The duration is a parameter indicating the number of subframes to which CSI-RSs are consecutively transmitted. Referring to FIG. 14, CSI-RSs for different antenna ports are transmitted to subframes 3 and 4. For instance, CSI-RSs for antenna ports 0~3 may be transmitted to the subframe 3, and CSI-RSs for antenna ports 4~7 may be transmitted to the subframe 4.

Once the base station informs a CSI-RS period, a CSI-RS offset, a duration, or the number of subframes to which CSI-RSs are transmitted, etc., the UE measures CSI-RSs of the base station at a corresponding position indicated by the CSI-RS period, the CSI-RS offset, the duration, or the number of subframes to which CSI-RSs are transmitted, etc. Then, the UE reports information on CQI, PMI, RI, etc. to the base station. The CSI-RS related information is cell-specific information.

Figure 15:
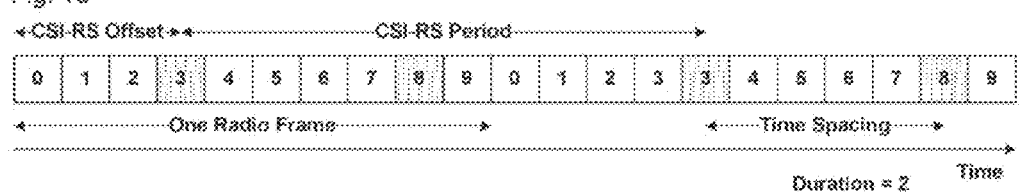
FIG. 15 is a view showing a case that CSI-RSs of one base station are transmitted to a plurality of subframes in a CSI-RS transmitting method according to another embodiment of the present invention.

FIG. 15 is a view showing a case that reference signals of one base station are transmitted to a plurality of subframes in a CSI-RS transmitting method according to another embodiment of the present invention. Here, it is assumed that the reference signals are implemented as CSI-RSs.

According to one preferred embodiment shown in FIG. 14, the base station transmits CSI-RSs to a plurality of consecutive subframes. On the other hand, according to another preferred embodiment shown in FIG. 15, the base station transmits CSI-RSs to a plurality of non-consecutive subframes.

Referring to FIG. 15, the base station transmits CSI-RSs through a plurality of non-consecutive subframes. In this case, the base station has to inform, to the UE, a CSI-RS period, a CSI-RS offset, a duration for which CSI-RSs are transmitted to a plurality of subframes within one CSI-RS period, the number of subframes to which CSI-RSs have been allocated within a CSI-RS period, a time spacing of dispersed subframes in a case that CSI-RSs are transmitted to the dispersed subframes, etc.

Referring to FIG. 15, the UE can feedback channel information on entire transmit antenna ports to the base station by measuring all of CSI-RSs transmitted to subframes 3 and 8 by the base station with respect to all the transmit antenna ports of the base station. If the duration is 2, the UE has to measure all of CSI-RSs transmitted to two subframes. After completing the channel measurement, the UE can be recognized to have received all of CSI-RSs transmitted from the base station.

Referring to FIG. 15, when CSI-RSs are transmitted to two subframes in a dispersive manner, a unit distance between the two subframes is defined as time spacing. That is, when transmitting CSI-RSs in a dispersive manner, additionally required is information on time spacing indicating that next CSI-RSs are to be transmitted with an interval of subframes (e.g., 5 subframes in FIG. 15). If the base station always transmits CSI-RSs to subframes in a dispersive manner with uniform time spacing, the UE can easily calculate spacing information based on the CSI-RS period and the CSI-RS duration. In FIG. 15, the base station can calculate spacing information of 5 subframes (=CSI-RS period (10)/CSI-RS duration (2)).

As aforementioned, the base station may transmit information on CSI-RSs of transmit antenna ports in a manner to transmit to one subframe within a CSI-RS period, a manner to transmit to a plurality of consecutive subframes within a CSI-RS period, or a manner to transmit to a plurality of dispersed subframes within a CSI-RS period with uniform or non-uniform time spacing.

A Method for Notifying a Subframe to which a Reference Signal is Transmitted

In a case that all of the three CSI-RS transmission methods are adopted in a communication system, the base station transmits, to the UE, information on a CSI-RS period, a CSI-RS offset, a CSI-RS duration (integer more than 1), and a reference signal position such as a bit indicating whether CSI-RSs are transmitted to a plurality of consecutive subframes or a plurality of non-consecutive (dispersed) subframes. Accordingly, the base station may inform, to the UE, a subframe to which CSI-RSs are transmitted.

More concretely, if a CSI-RS duration is '1', it means that CSI-RSs for all antennas are transmitted to one subframe within one period. If the CSI-RS duration is more than '1', it means that CSI-RSs are transmitted to a plurality of subframes. If a bit indicating transmission of CSI-RSs to a plurality of dispersed subframes is set, the UE can calculate information on time spacing between the dispersed subframes by the aforementioned method (that is, time spacing=ceiling(CSI-RS period/CSI-RS duration), and the ceiling(x) represents a largest integer among numbers equal to or less than the 'x').

Differently from the aforementioned method, the base station may inform a CSI-RS period and a CSI-RS offset to the UE, and may inform a pattern of subframes to which CSI-RSs are transmitted within a CSI-RS period in the form of a bitmap. Hereinafter, will be explained advantages of the method for informing, to the UE, by the base station, a pattern of subframes to which CSI-RSs are transmitted within a CSI-RS period in the form of a bitmap.

A method for simultaneously transmitting CSI-RSs for all antenna ports to one subframe, and a method for transmitting CSI-RSs for all antenna ports to a plurality of subframes in a dispersive manner have advantages and disadvantages, respectively. More concretely, CSI-RSs influence on a performance of an LTE UE since they perform functions of an LTE-A system. These CSI-RSs are directly associated with the amount of REs for CSI-RS transmission in a PDSCH region used by the LTE UE, and are also associated with an MCS of a corresponding LTE UE.

One of important features of the LTE-A system is introduction of a relay. In the LTE-A system, preferably used is a 'Type 1 Relay' method for performing functions of a base station by a relay node (RN) in the aspect of a UE. In this case, the RN receives data, from the base station, data of UEs to which the RN has to serve within its coverage. Then, the RN schedules the data, and provides a service to the UE.

The RN has a disadvantage that it cannot transmit data received from the base station to the UE while receiving the data in the same bandwidth due to self interference of a radio frequency (RF). Accordingly, the RN is operated in a half duplex transmission manner that a data reception subframe and a data transmission subframe are distinguished from each other. This may cause the UE receiving a service from the RN in a subframe where the RN receives downlink data from the base station, to recognize its serving cell to have disappeared. The reason is because a common reference signal (CRS) transmitted per subframe cannot be received by the UE. This problem can be solved by a signaling method using a multicast broadcast over a single frequency network (MBSFN) subframe, or a multimedia broadcasting single frequency network (MBSFN) subframe defined in the LTE system.

However, the problem cannot be completely solved by the MBSFN subframe. The UE has to receive channels such as a BCH, a SCH and a PCH so as to receive a service from the base station. In the LTE system, a subframe to which the channels are transmitted is defined in advance. For instance, since the channels are transmitted to subframes 0, 4, 5 and 9, the RN has to transmit data to the subframes through a downlink. This means that the RN cannot receive a signal from the base station in the corresponding subframes to which the channels are transmitted.

For an enhanced link performance between the base station and the RN, the RN has to also receive CSI-RSs from the base station. Therefore, the base station should not transmit CSI-RSs to subframes to which data is transmitted from the RN through a downlink. That is, the base station has to transmit CSI-RSs only to subframes where the RN receives downlink data from the base station. In this case, the base station may have a difficulty in transmitting CSI-RSs with a constant subframe interval per frame within a predetermined period. The RN can also transmit CSI-RSs only when transmitting downlink data. As a result, the RN may also have a difficulty in transmitting CSI-RSs with a constant subframe interval per frame within a predetermined period. In this case, transmission positions of CSI-RSs are preferably informed through signaling in the form of a bitmap of a frame unit, rather than by using parameters such as a CSI-RS duration or a CSI-RS time spacing.

The base station has to notify, to the UE, not only information on signaling of subframes to which CSI-RSs are transmitted, but also information indicating a CSI-RS of which antenna port is to be transmitted to which subframe. As aforementioned, the main reason why CSI-RSs are transmitted to a plurality of subframes in a dispersive manner is because the number of REs used to transmit maximum eight CSI-RSs at one time is operated as an overhead in the LTE UE. By the dispersive CSI-RS transmission method, a CSI-RS of a different antenna port or a CSI-RS of a different antenna port group is transmitted to a different subframe.

For instance, when CSI-RSs are transmitted to two subframes in a dispersive manner, CSI-RSs of some antenna ports and CSI-RSs of the rest antenna ports are transmitted to the two subframes in a dispersive manner. Here, the UE has to know information indicating that a CSI-RS of which antenna port is transmitted to the first CSI-RS subframe (e.g., subframe 3 in FIG. 14) and the second CSI-RS subframe (e.g., subframe 4 in FIG. 14). Accordingly, the base station has to inform, to the UE, an offset value of a CSI-RS subframe unit, the subframe to which a CSI-RS of each antenna port is transmitted. For instance, the offset value may be an integer more than '0'.

So far, the method for transmitting a reference signal in a time domain was explained in more detail. Hereinafter, will be explained the method by categorizing into a method for notifying information on a reference signal of a serving cell, a method for notifying information on a reference signal of a neighboring cell, a method for notifying information on a CoMP set, and a method for notifying information to be provided to the UE when a reference signal is transmitted to one or more subbands.

A Method for Notifying Information on a Reference Signal of a Serving Cell

The present invention proposes two types of method for notifying CSI-RS related information by the base station to the UE in a general single cell transmission environment with respect to the UE.

The first type is a method for broadcasting all information on CSI-RSs. In the LTE system, system information is notified to UEs through a BCH. However, if it is impossible to transmit all of the system information through the BCH due to a large amount of contents, a PDCCH of corresponding data is masked with a cyclic redundancy check (CRC) by using a system information radio network temporary identifier (SI-RNTI) rather than an ID of a specific UE. Then, the system information is transmitted in the same manner as general data. Like general unicast data, the system information is transmitted to a PDSCH region. Then, all UEs inside a cell decodes a PDCCH by using an SI-RNTI, and then decodes a PDSCH indicated by the corresponding PDCCH thereby acquiring system information. This broadcasting method is called a dynamic BCH (DBCH) using method differently from a general broadcasting method, a physical broadcast channel (PBCH) using method.

System information broadcast in the LTE system may include a master information block (MIB) transmitted through a PBCH, and a system information block (SIB) transmitted through a PDSCH and multiplexed with general unicast data. The present invention proposes transmission of CSI-RS related information which has to be notified to all UEs by including the information in an SIB newly introduced and additionally defined in the LTE system.

The CSI-RS related information includes a CSI-RS sequence, positions in time and frequency domains, a CSI-RS duration, a CSI-RS offset of a subframe unit, a frequency offset, a frequency shift, a CSI-RS duration indicating the number of subframes when CSI-RSs are transmitted to a plurality of subframes in a dispersive manner, bitmap information indicating a subframe to which a CSI-RS is transmitted, an offset of a subframe to which a CSI-RS of each antenna port is transmitted, etc. The CSI-RS related information is transmitted by being included in the SIB additionally defined in the LTE-A system in a DBCH manner. Then, the conventional LTE UEs do not decode the new SIB, whereas LTE-A UEs capable of decoding the new SIB acquire the CSI-RS related information.

The second type is a method for transmitting CSI-RS related information to the UE by the base station through RRC signaling. More concretely, through RRC signaling, the base station informs, to the UE, a CSI-RS sequence, positions in time and frequency domains, a CSI-RS duration, a CSI-RS offset of a subframe unit, a frequency offset, a frequency shift, a CSI-RS duration indicating the number of subframes when CSI-RSs are transmitted to a plurality of subframes in a dispersive manner, bitmap information indicating a subframe to which a CSI-RS is transmitted, an offset of a subframe to which a CSI-RS of each antenna port is transmitted, etc. The UE acquires the CSI-RS related information provided from the base station through RRC signaling, thereby measuring CSI-RSs.

A Method for Notifying Information on a Reference Signal of a Neighboring Cell

The LTE-A system adopts a CoMP method, a method for transmitting a signal to a UE in a cooperative manner between base stations. In order to receive a service in a CoMP manner, the UE has to measure a reference signal of a neighboring cell as well as a reference signal of its serving cell. Especially, in order to measure a state of a channel from the base station included in a CoMP cooperating set or a CoMP measurement set, the UE has to measure a reference signal (CSI-RS) of other cell rather than a reference signal of its serving cell. Here, the UE can not measure a CSI-RS of other cell inside a CoMP set without support from a serving base station. Therefore, the present invention proposes two types of method for informing CSI-RS related information of other base station to a UE by a serving base station when a CoMP system is operated. A method for notifying information on a CoMP cooperating set or a CoMP measurement set will be explained later.

The first type is a method for transmitting CSI-RS related information of neighboring cells through a DBCH by a serving base station. More concretely, through an SIB additionally defined in the LTE-A system, the serving base station informs, to its all UEs, CSI-RS related information of all neighboring cells anticipated to be operated in a CoMP system, that is, a CSI-RS sequence, positions in time and frequency domains, a CSI-RS duration, a CSI-RS offset of a subframe unit, a frequency offset, a frequency shift, a CSI-RS duration indicating the number of subframes when CSI-RSs are transmitted to a plurality of subframes in a dispersive manner, bitmap information indicating a subframe to which a CSI-RS is transmitted, an offset of a subframe to which a CSI-RS of each antenna port is transmitted, etc. As aforementioned, when broadcasting the CSI-RS related information, the base station transmits control information to a PDCCH region by using an SI-RNTI, and transmits system information, CSI-RS related information to a corresponding PDSCH region by multiplexing with general unicast data.

That is, once the base station has transmitted its CSI-RS information and CSI-RS information on all neighboring cells which can be operated in a CoMP system to a PDSCH region by using an SI-RNTI, LTE-A UEs acquire CSI-RS information on a serving cell and neighboring cells. Then, the UE measures a CSI-RS of its serving cell under a general serving cell operation by using the information, and reports channel information such as CSI, CQI, PMI and RI to the base station. The broadcast CSI-RS information of neighboring cells is cell-specific information.

The second type is a method for transmitting all CSI-RS related information of neighboring cells through RRC signaling. Here, a CSI-RS of a serving cell is preferably transmitted through a DBCH. Through RCC signaling, the base station informs, to the UE, CSI-RS related information of all neighboring cells anticipated to be operated in a CoMP system, that is, a CSI-RS sequence, positions in time and frequency domains, a CSI-RS duration, a CSI-RS offset of a subframe unit, a frequency offset, a frequency shift, a CSI-RS duration indicating the number of subframes when CSI-RSs are transmitted to a plurality of subframes in a dispersive manner, bitmap information indicating a subframe to which a CSI-RS is transmitted, an offset of a subframe to which a CSI-RS of each antenna port is transmitted, etc. The CSI-RS related information of neighboring cells is cell-specific information.

A Method for Notifying Information on a CoMP Set

The first type is a method for broadcasting CSI-RS related information of neighboring cells to the entire cells in a DBCH using manner, and for transmitting information on a CoMP set for a substantial CoMP operation through RRC signaling.

Critical information included in RRC signaling of a CoMP set is a cell ID which has to be measured by the UE, i.e., a cell number indicating which cells (base stations, access points, etc.) are included in a corresponding CoMP set. Here, an indicator indicating CSI-RS information on a serving cell among the entire CSI-RS information is transmitted through RRC signaling.

The UE receives CSI-RS information on neighboring cells through a DBCH, and, through RRC signaling of a CoMP set, receives information on a cell of which CSI-RS has to be measured. Then, the UE reports, to the base station, channel information such as CSI, CQI, PMI and RI on neighboring cells to be measured.

Accordingly, the UE receives a signal on a CoMP set from a radio resource control (RRC) entity (level), and measures CSI-RSs of corresponding base stations indicated by the signal thereby feeding the measured CSI-RSs back. This may allow cells inside a CoMP set to be cooperative with each other. The signal on a CoMP set is UE-specific information.

The second type is a method for notifying an ID of a corresponding cell when informing a CoMP set to the UE by the base station through RRC signaling. More concretely, once the base station has transmitted its CSI-RS information and CSI-RS information on all neighboring cells which can be operated in a CoMP system through RRC signaling, LTE-A UEs acquire CSI-RS information on a serving cell and neighboring cells.

Then, the UE measures a CSI-RS of its serving cell under a general serving cell operation by using the information, and reports channel information such as CSI, CQI, PMI and RI to the base station. Also, the UE receives a signal on a CoMP set from a radio resource control (RRC) entity (level), and measures CSI-RSs of corresponding base stations indicated by the signal thereby feeding the measured CSI-RSs back. This may allow cells inside a CoMP set to be cooperative with each other. The signal on a CoMP set is UE-specific information.

Information to be Notified to the UE when Transmitting a Reference Signal to One or More Subbands Rather than a case that a CSI-RS of one antenna port is transmitted to the entire band in one subframe, the CSI-RS of one antenna port may be transmitted to one or more subbands divided from the entire band. In this case, the base station has to notify, to the UE, information on a subband to which a CSI-RS is transmitted, as CSI-RS information.

Figure 16:
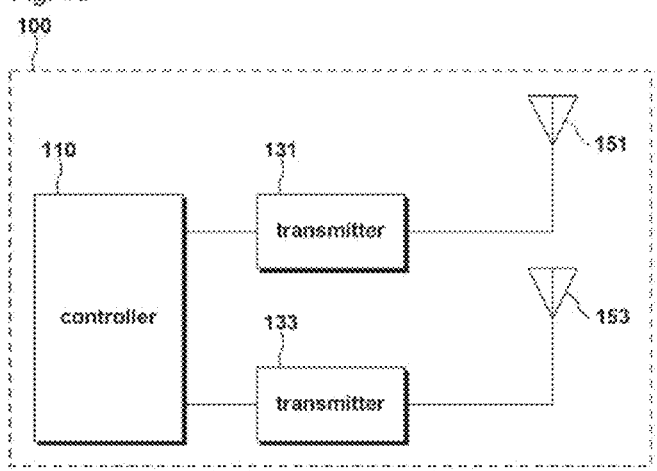
FIG. 16 is a block diagram showing an apparatus for transmitting a CSI-RS according to one embodiment of the present invention.

FIG. 16 is a block diagram showing an apparatus for transmitting a CSI-RS according to one embodiment of the present invention.

The apparatus 100 for transmitting a CSI-RS according to one embodiment of the present invention may comprise a controller 110, transmitters 131 and 133, a plurality of antennas 151 and 153, etc. The apparatus 100 for transmitting a CSI-RS according to one embodiment of the present invention may be a base station. Hereinafter, it will be explained in an assumption that a base station is implemented as the apparatus for transmitting a reference signal. However, it should be noted that the base station is merely exemplary and the present invention is not limited to this.

The controller 110 transmits a control signal for controlling the entire operations of the transmitters 131 and 133.

The controller 110 determines a CSI-RS of each of the plurality of antennas 151 and 153, and allocates the determined CSI-RSs to resource elements (REs) included in at least one subframe within a CSI-RS period.

The transmitters 131 and 133 transmit, to the UE, position information of the at least one subframe in a time domain, and position information of the REs in time and frequency domains, the subframes and the REs to which the CSI-RSs have been allocated.

The transmitters 131 and 133 transmit the CSI-RS to the UE through a downlink.

Although not shown in FIG. 16, the apparatus 100 for transmitting a CSI-RS according to one embodiment of the present invention may comprise a receiver (not shown) configured to receive a channel measurement result transmitted from the UE with respect to the CSI-RS.

With reference to FIGS. 1 to 15, the apparatus 100 for transmitting a CSI-RS according to one embodiment of the present invention may be understood similarly to the method for transmitting a CSI-RS according to one embodiment of the present invention. Accordingly, detailed explanations of the apparatus 100 will be omitted.

Figure 17:
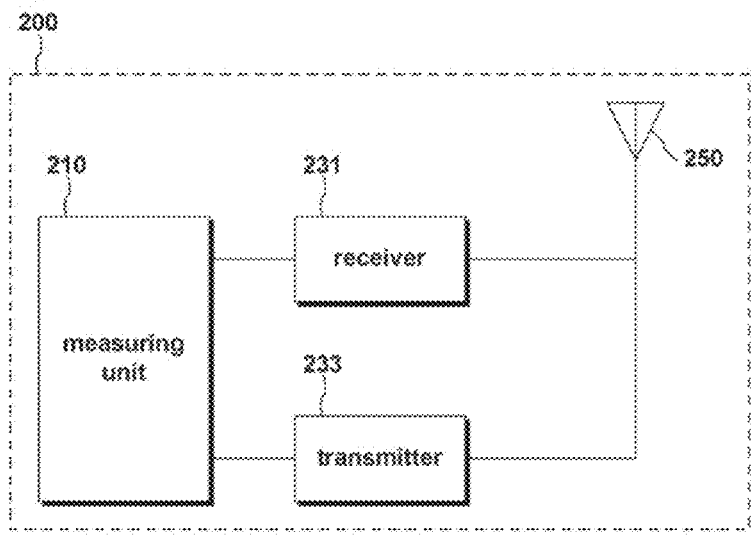
FIG. 17 is a block diagram showing an apparatus for transmitting a result of channel measurement according to one embodiment of the present invention.

FIG. 17 is a block diagram showing an apparatus for transmitting a result of channel measurement according to one embodiment of the present invention.

The apparatus 200 for transmitting a result of channel measurement according to one embodiment of the present invention may comprise a measuring unit 210, a receiver 231, a transmitter 233, an antenna 250, etc. The apparatus 200 for transmitting a result of channel measurement according to one embodiment of the present invention may be a UE. Hereinafter, it is assumed that a UE is implemented as the apparatus 200 for transmitting a result of channel measurement. However, it should be noted that this is merely exemplary, and the present invention is not limited to this.

The receiver 231 is configured to receive position information of the at least one subframe in a time domain, and position information of the REs in time and frequency domains, the subframes and the REs to which the CSI-RSs have been allocated.

The measuring unit measures the CSI-RS by using the position information of the at least one subframe in a time domain, and position information of the REs in time and frequency domains, the subframes and the REs to which the CSI-RSs have been allocated.

The receiver 233 transmits a result of the CSI-RS measurement to the base station through an uplink.

Although not shown, the apparatus 200 for transmitting a result of channel measurement according to one embodiment of the present invention may comprise a plurality of antennas (not shown) which perform multiple input multiple out- With reference to FIGS. 1 to 15, the apparatus 200 for transmitting a result of channel measurement according to one embodiment of the present invention may be understood similarly to the method for transmitting a CSI-RS according to one embodiment of the present invention. Accordingly, detailed explanations of the apparatus 200 will be omitted.

The apparatus according to one embodiment of the present invention may comprise hardware, software and a recording medium, e.g., an output device (display device, speaker, etc.), an input device (touch screen, keypad, microphone, etc.), a memory and a process each required to implement the technical features of the present invention, as well as the aforementioned components. These components are obvious to those skilled in the art, and thus their detailed explanations will be omitted.

The above apparatus according to one embodiment of the present invention may be implemented in a computer-readable medium using, for example, computer software, hardware, or some combination thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. For a software implementation, the apparatus described herein may be implemented with one or more software modules which perform the aforementioned functions or operations. The modules may be implemented by software codes written in any suitable programming language, and the software codes may be stored in a memory and executed by a processor. The memory or processor may be implemented as a means well-known to those skilled in the art.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

What is claimed is:

1. A method for receiving a Channel State Information-Reference Signal (CSI-RS) for measuring a channel, the method comprising:
   receiving CSI-RSs on resource elements (REs) in a subframe configured for the CSI-RSs from a base station,
   wherein if each CSI-RS of the received CSI-RSs is transmitted from each of four or more transmit antenna ports of the base station, at least two REs on which each CSI-RS is received are associated with each of the four or more transmit antenna ports, and
   wherein the at least two REs on which the each CSI-RS is received are located only in one resource block (RB) among two RBs of the subframe and are adjacent to each other in the time domain in the one RB; and
   transmitting channel state information based on the received CSI-RSs.

2. The method of claim 1, wherein if a first CSI-RS of the CSI-RSs is received on two specific REs associated with a first transmit antenna port of the base station, a second CSI-RS of the CSI-RSs is received on two REs, which are shifted from the two specific REs by a preset offset and are associated with a second transmit antenna port of the base station.

3. The method of claim 2, wherein the two REs shifted from the two specific REs are determined based on at least a time offset or a frequency offset to the two specific REs associated with the first transmit antenna port.

4. The method of claim 2, wherein CSI-RSs transmitted from an antenna port group including the second transmit antenna port are allocated to shifted REs, the shifted REs being determined based on offsets to REs of a specific antenna port group including the first transmit antenna port.

5. The method of claim 2, wherein positions of the two REs shifted from the two specific REs are dependent on positions of the two specific REs associated with the first transmit antenna port.

6. The method of claim 1, further comprising:
   receiving configuration information for configuring the CSI-RSs,
   wherein the configuration information comprises subframe configuration information indicating the subframe in which the CSI-RSs are received and resource configuration information indicating allocated REs of the CSI-RSs.

7. The method of claim 1, wherein the CSI-RSs are periodically received in a time domain with a period of specific integer times of one subframe.

8. The method of claim 1, wherein the REs are mapped in consideration of a symbol number.

9. An apparatus for receiving a Channel State Information-Reference Signal (CSI-RS) for measuring a channel, the apparatus comprising:
   a plurality of antenna ports; and
   a controller configured for controlling the plurality of antenna ports and receiving CSI-RSs in a subframe configured for the CSI-RSs from a base station,
   wherein if each CSI-RS of the CSI-RSs is transmitted from each of four or more transmit antenna ports of the base station, at least two REs on which each CSI-RS is received are associated with each of the four or more transmit antenna ports,
   wherein the at least two REs on which the each CSI-RS is received are located only in one resource block (RB) among two RBs of the subframe and are adjacent to each other in the time domain in the one RB, and
   wherein the controller is further configured for controlling the plurality of antenna ports to transmit channel state information based on the received CSI-RSs.

10. The apparatus of claim 9, wherein if a first CSI-RS of the CSI-RSs is received on two specific REs associated with a first transmit antenna port of the base station, a second CSI-RS of the CSI-RSs is received on two REs, which are shifted from the two specific REs by a preset offset and are associated with a second transmit antenna port of the base station.

11. The apparatus of claim 10, wherein the two REs shifted from the two specific REs are determined based on at least a time offset or a frequency offset to the two specific REs associated with the first transmit antenna port.

12. The apparatus of claim 10, wherein CSI-RSs transmitted from an antenna port group including the second transmit antenna port are allocated to shifted REs, the shifted REs being determined based on offsets to REs of a specific antenna port group including the first transmit antenna port.

13. The apparatus of claim 10, wherein positions of the two REs shifted from the two specific REs are dependent on positions of the two specific REs associated with the first transmit antenna port.

14. The apparatus of claim 9, wherein the controller is further configured for:
   receiving configuration information for configuring the CSI-RSs, wherein the configuration information comprises subframe configuration information indicating the subframe in which the CSI-RSs are received and resource configuration information indicating allocated REs of the CSI-RSs.

15. The apparatus of claim 9, wherein the CSI-RSs are periodically received in a time domain with a period of specific integer times of one subframe.

16. The apparatus of claim 9, wherein the REs are mapped in consideration of a symbol number.

* * * * *